US010388952B2

(12) United States Patent
Park et al.

(10) Patent No.: US 10,388,952 B2
(45) Date of Patent: Aug. 20, 2019

(54) METHOD OF COATING ACTIVE MATERIAL OF BATTERY AND ELECTRONIC DEVICE HAVING THE SAME

(71) Applicant: Samsung Electronics Co., Ltd., Gyeonggi-do (KR)

(72) Inventors: Jungsik Park, Gyeonggi-do (KR); Woongeun Kwak, Gyeonggi-do (KR); Junyun Kim, Gyeonggi-do (KR); Dohun Cha, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 47 days.

(21) Appl. No.: 15/851,033

(22) Filed: Dec. 21, 2017

(65) Prior Publication Data
US 2018/0183059 A1  Jun. 28, 2018

(30) Foreign Application Priority Data
Dec. 23, 2016  (KR) .................. 10-2016-0178006

(51) Int. Cl.
*H01M 2/26* (2006.01)
*H01M 10/0525* (2010.01)
(Continued)

(52) U.S. Cl.
CPC .......... *H01M 4/525* (2013.01); *H01M 2/263* (2013.01); *H01M 4/0402* (2013.01); *H01M 4/62* (2013.01);
(Continued)

(58) Field of Classification Search
CPC ............ H01M 4/525; H01M 10/0587; H01M 10/0525; H01M 2/263; H01M 4/0402; H01M 4/62
See application file for complete search history.

(56) References Cited

U.S. PATENT DOCUMENTS 7,993,770 B2 *  8/2011  Hyung ............... H01M 2/263
                                                    429/211
9,478,824 B2 * 10/2016  Chung ............... H01M 2/0207
(Continued)

FOREIGN PATENT DOCUMENTS

KR    1020050096002     10/2005
KR    10-1156377        6/2012

OTHER PUBLICATIONS

International Search Report dated Mar. 30, 2018 issued in counterpart application No. PCT/KR2017/015238, 3 pages.

*Primary Examiner* — Stewart A Fraser
(74) *Attorney, Agent, or Firm* — The Farrell Law Firm, P.C.

(57) ABSTRACT

A battery is disclosed and includes a positive electrode assembly including a positive electrode substrate, a positive electrode active material coated at one surface of the positive electrode substrate, and a positive electrode tab attached to the one surface of the positive electrode substrate; a negative electrode assembly including a negative electrode substrate, a negative electrode active material coated at one surface of the negative electrode substrate, and a negative electrode tab attached to the one surface of the negative electrode substrate; and a separator located between the positive electrode assembly and the negative electrode assembly, wherein in a first area facing the positive electrode tab at the one surface of the negative electrode substrate, the negative electrode active material is not coated, and in a second area adjacent to the first area in a length direction of the positive electrode tab at the one surface of the negative electrode substrate, the negative electrode active material is coated.

22 Claims, 25 Drawing Sheets

(51) Int. Cl.
  *H01M 10/0587*   (2010.01)
  *H01M 4/525*   (2010.01)
  *H01M 4/04*   (2006.01)
  *H01M 4/62*   (2006.01)
  *H01M 4/58*   (2010.01)
  *H01M 4/505*   (2010.01)
  *H01M 4/02*   (2006.01)

(52) U.S. Cl.
  CPC ... *H01M 10/0525* (2013.01); *H01M 10/0587* (2013.01); *H01M 4/505* (2013.01); *H01M 4/5825* (2013.01); *H01M 2004/027* (2013.01); *H01M 2004/028* (2013.01)

(56) References Cited

U.S. PATENT DOCUMENTS

| | | | |
|---|---|---|---|
| 2006/0227605 A1 | 10/2006 | Choi et al. | |
| 2009/0130548 A1* | 5/2009 | Lee | H01M 2/263 |
| | | | 429/161 |
| 2010/0035144 A1 | 2/2010 | Oh et al. | |
| 2011/0129701 A1 | 6/2011 | Seo | |
| 2011/0151295 A1* | 6/2011 | Kim | H01M 2/263 |
| | | | 429/94 |
| 2011/0293977 A1 | 12/2011 | Kim et al. | |
| 2015/0037638 A1 | 2/2015 | Kim et al. | |

\* cited by examiner

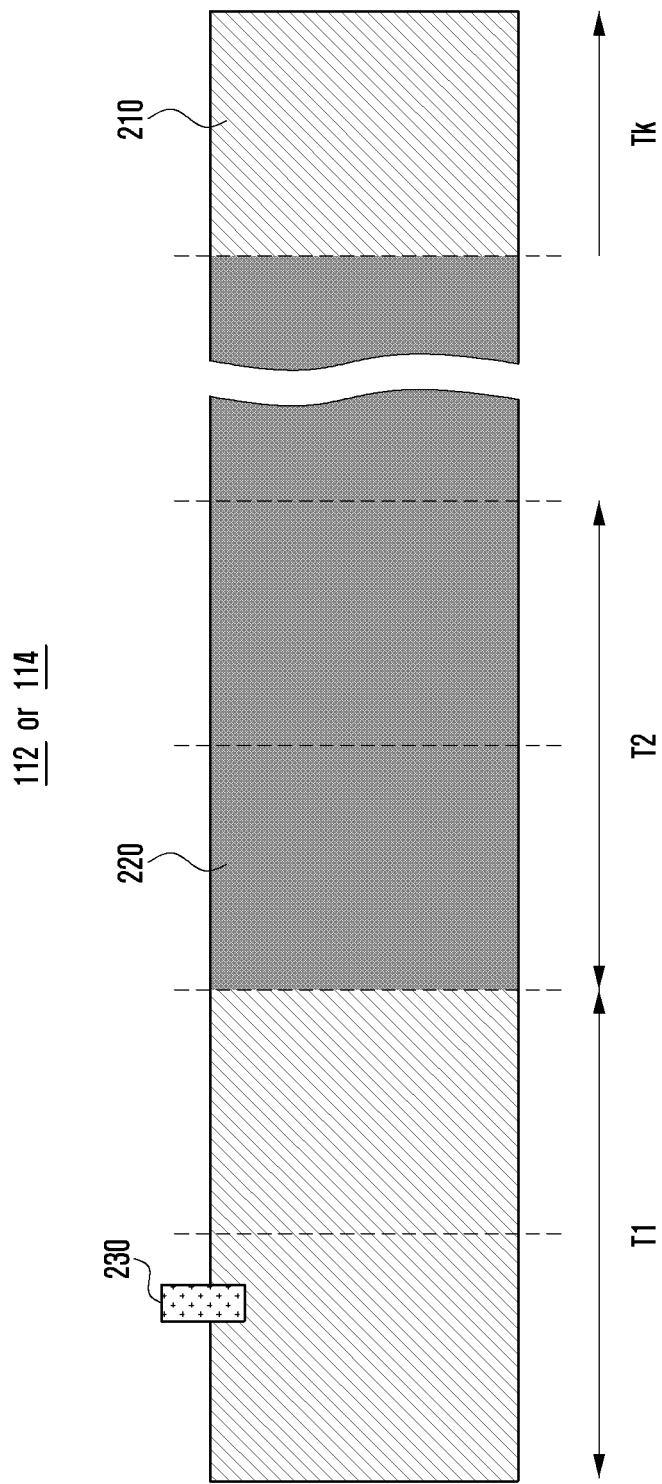

METHOD OF COATING ACTIVE MATERIAL OF BATTERY AND ELECTRONIC DEVICE HAVING THE SAME

PRIORITY

This application claims priority under 35 U.S.C. § 119(a) to a Korean Patent Application filed in the Korean Intellectual Property Office on Dec. 23, 2016 and assigned Serial No. 10-2016-0178006, the contents of which are incorporated herein by reference.

BACKGROUND

1. Field of the Disclosure

The present disclosure relates generally to an electronic device having a battery, and more particularly, to a method of coating an active material of a battery and an electronic device to which the method is applied.

2. Description of the Related Art

Recently, with the increased demand for mobile electronic devices, a demand for batteries has also increased. Lithium ion batteries are recognized for their high energy density, high discharge voltage, and desirable output stability, and are widely being used.

Batteries are classified into groups, such as nickel cadmium batteries, nickel hydrogen batteries, lithium ion batteries, and lithium polymer batteries. In addition, batteries are classified depending on according to a material used for a positive electrode, a negative electrode, or an electrolyte. Also, batteries are classified according to shape, such as a cylindrical shape, a square shape, and a pouch shape.

There is a high demand for square shape or pouch shape batteries that may be applied to mobile phones because of the battery's thin thickness. From a battery material viewpoint, there is a high demand for a lithium battery, such as a lithium ion battery, and a lithium polymer battery having a high energy density, a high discharge voltage, and improved safety. The lithium ion battery is configured with a negative electrode plate coated with a negative electrode active material, a positive electrode plate coated with a positive electrode active material, and a separator disposed between the negative electrode plate and the positive electrode plate The lithium ion battery uses a lithium-containing oxide as the positive electrode active material and a carbon material as the negative electrode active material.

One of the major research tasks in the battery field is to enhance safety. In general, safety accidents, such as fires and explosions, may occur in a lithium ion battery used for a mobile electronic device. These safety accidents may result from an internal short, a charge state that exceeds an allowed current or voltage, an exposure to a high temperature, and an impact caused by dropping.

SUMMARY

The present disclosure has been made to address the above-mentioned shortcomings and to provide a battery and an electronic device in which safety is enhanced.

Accordingly, an aspect of the present disclosure includes a battery comprising a positive electrode assembly including a positive electrode substrate, a positive electrode active material coated at one surface of the positive electrode substrate, and a positive electrode tab attached to the one surface; a negative electrode assembly including a negative electrode substrate, a negative electrode active material coated at one surface of the negative electrode substrate, and a negative electrode tab attached to the one surface of the negative electrode substrate; and a separator located between the positive electrode assembly and the negative electrode assembly, wherein in a first area facing the positive electrode tab at the one surface of the negative electrode substrate, the negative electrode active material is not coated, and in a second area adjacent to the first area in a length direction of the positive electrode tab at the one surface of the negative electrode substrate, the negative electrode active material is coated.

According to another aspect of the present disclosure, a battery comprises a positive electrode assembly including a positive electrode substrate, a positive electrode active material coated at one surface of the positive electrode substrate, and a positive electrode tab attached to the one surface; a negative electrode assembly including a negative electrode substrate, a negative electrode active material coated at one surface of the negative electrode substrate, and a negative electrode tab attached to the one surface of the negative electrode substrate; and a separator located between the positive electrode assembly and the negative electrode assembly, wherein in a first area facing the negative electrode tab at the one surface of the positive electrode substrate, the positive electrode active material is not coated, and in a second area adjacent to the first area in a length direction of the negative electrode tab at the one surface of the positive electrode substrate, the positive electrode active material is coated.

According to another aspect of the present disclosure, an electronic device includes a communication module; a processor; and a battery, wherein the battery includes a positive electrode assembly including a positive electrode substrate, a positive electrode active material coated at one surface of the positive electrode substrate, and a positive electrode tab attached to the one surface; a negative electrode assembly including a negative electrode substrate, a negative electrode active material coated at one surface of the negative electrode substrate, and a negative electrode tab attached to the one surface of the negative electrode substrate; and a separator located between the positive electrode assembly and the negative electrode assembly, wherein in a first area facing the positive electrode tab at the one surface of the negative electrode substrate, the negative electrode active material is not coated, and in a second area adjacent to the first area in a length direction of the positive electrode tab at the one surface of the negative electrode substrate, the negative electrode active material is coated.

BRIEF DESCRIPTION OF THE DRAWINGS

The above and other aspects, features, and advantages of the present disclosure will be more apparent from the following detailed description, taken in conjunction with the accompanying drawings, in which:

FIG. 2 is a top plan view of an unrolled surface of a positive electrode substrate or a negative electrode substrate according to an embodiment of the present disclosure;

DETAILED DESCRIPTION

Various embodiments of this disclosure will be described in detail with reference to the accompanying drawings. Embodiments and terms used herein do not limit the technology described to a specific embodiment but include various changes, equivalents, and/or replacements of a corresponding embodiment. The same reference numbers are used throughout the drawings to refer to the same or like parts. A singular expression may include a plurality of expressions unless explicitly represented differently.

In this disclosure, an expression such as "A or B" and "at least one of A or/and B" may include all possible combinations of the items listed together. An expression such as "first" and "second" may indicate corresponding constituent elements regardless of order and/or importance, and is used for distinguishing a constituent element from another constituent element, thereby not limiting corresponding constituent elements. When a constituent element is described (e.g., a first constituent element) and is "functionally (or communicatively) coupled to", or is "connected to", another constituent element (e.g., a second constituent element), it should be understood that the constituent element may be directly connected to the another constituent element or may be connected to the other constituent element through another constituent element (e.g., a third constituent element).

A battery, according to various embodiments of the present disclosure, may be a pouch type battery, and an electrode assembly may be configured in a jelly-roll shape sequentially wound from a central area. For example, a battery may have the same structure and constituent element as, or a structure and constituent element similar to, that of a battery disclosed in Korean Patent Laid-Open Publication No. 10-2005-0121512, Korean Patent Laid-Open Publication No. 10-2007-0006255, Korean Patent Laid-Open Publication No. 10-2006-0028177, or Korean Patent Laid-Open Publication No. 10-2006-0028184.

Figure 3A:
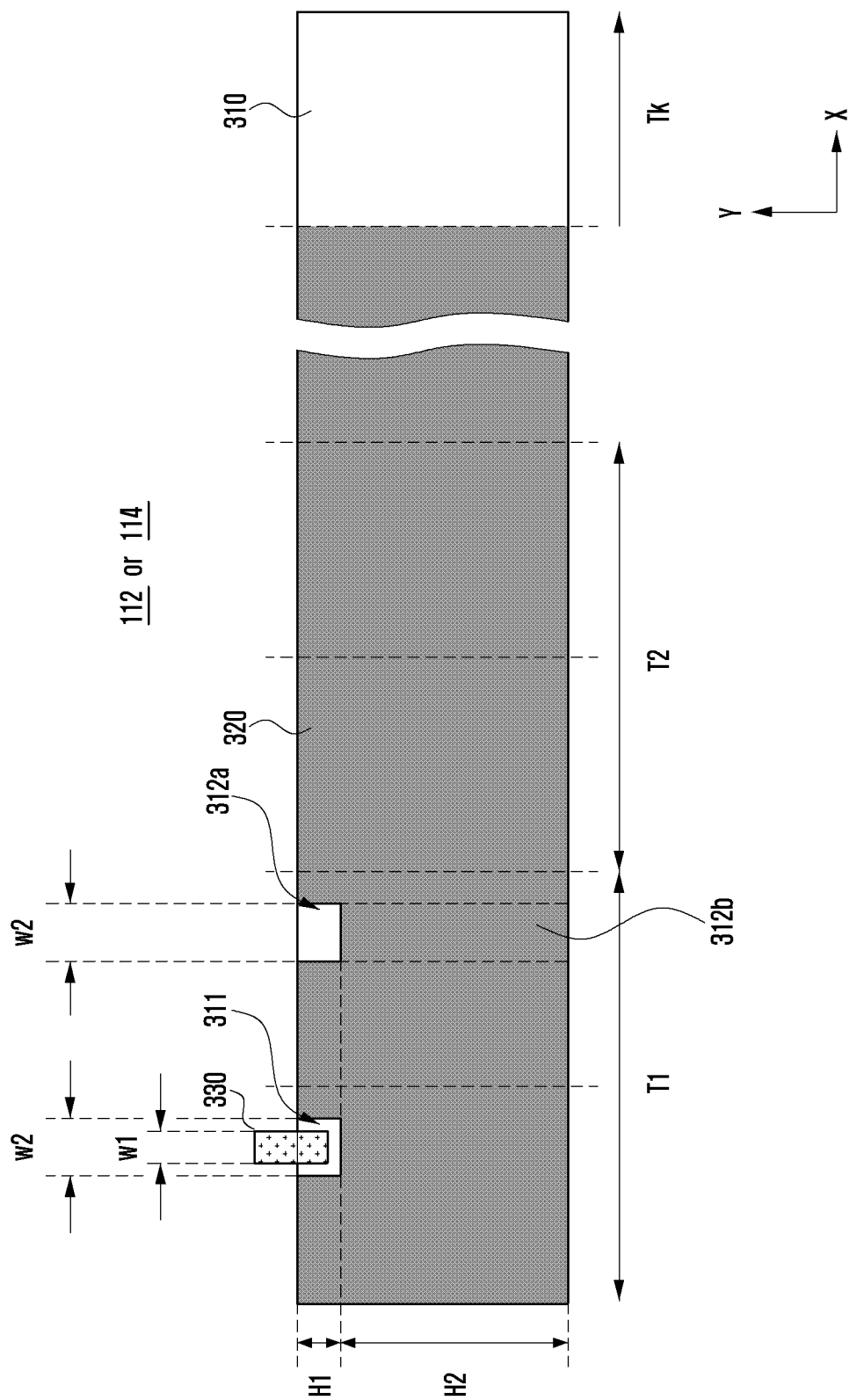
FIGS. 3A and 3B are top plan views of a positive electrode substrate or a negative electrode substrate according to another embodiment of the present disclosure.
Figure 3B:
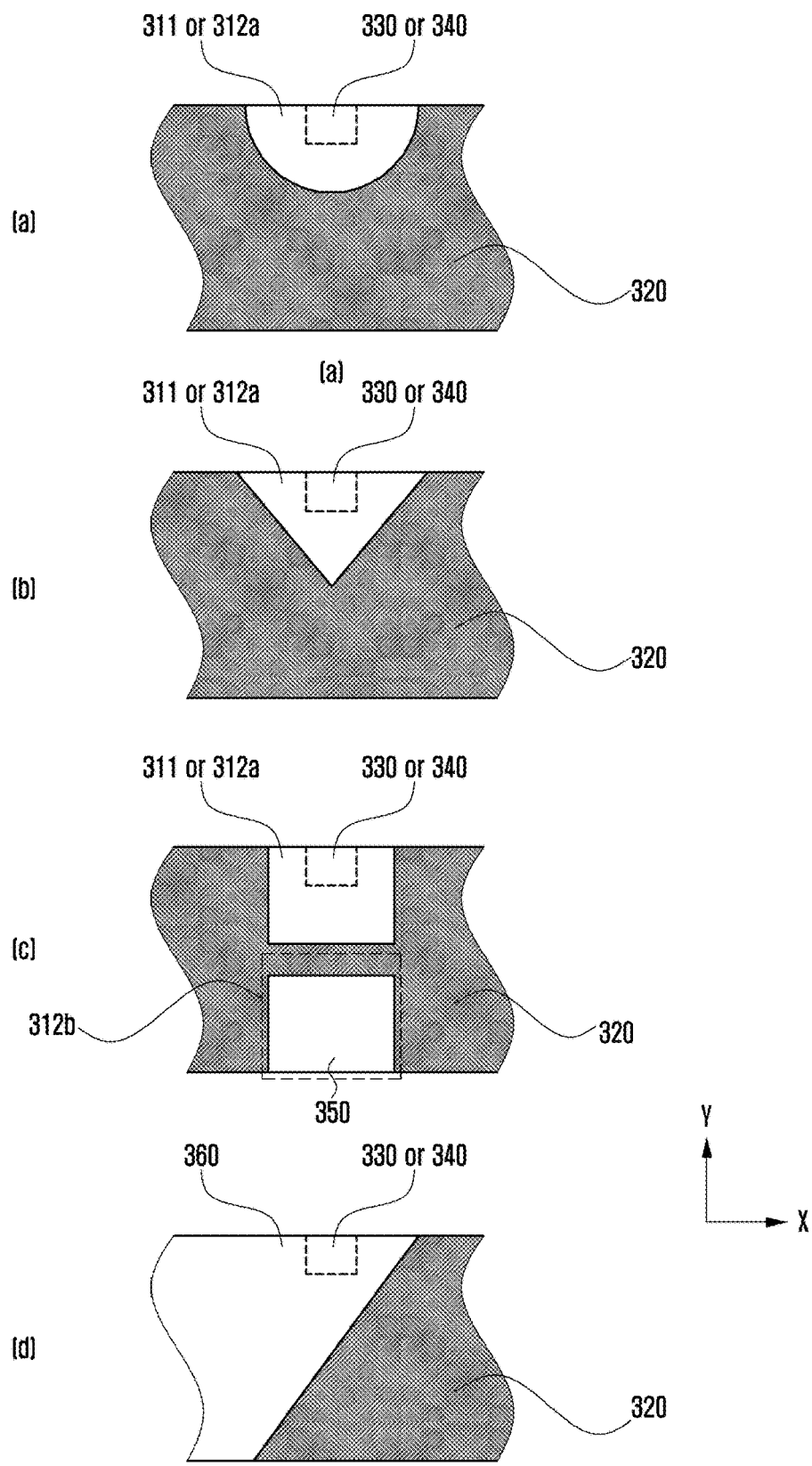

A battery, according to various embodiments of the present disclosure, includes a positive electrode assembly including a positive electrode substrate, a positive electrode active material coated at one surface of the positive electrode substrate, and a positive electrode tab attached to the one surface; a negative electrode assembly including a negative electrode substrate, a negative electrode active material coated at one surface of the negative electrode substrate, and a negative electrode tab attached to the one surface of the negative electrode substrate; and a separator located between the positive electrode assembly and the negative electrode assembly, wherein in a first area, such as a first area 312a of FIG. 3A, facing the positive electrode tab at the one surface of the negative electrode substrate, the negative electrode active material is not coated, and in a second area, such as a second area 312b of FIG. 3B, adjacent to the first area in a length direction of the positive electrode tab at the one surface of the negative electrode substrate, the negative electrode active material is coated.

Figure 6:
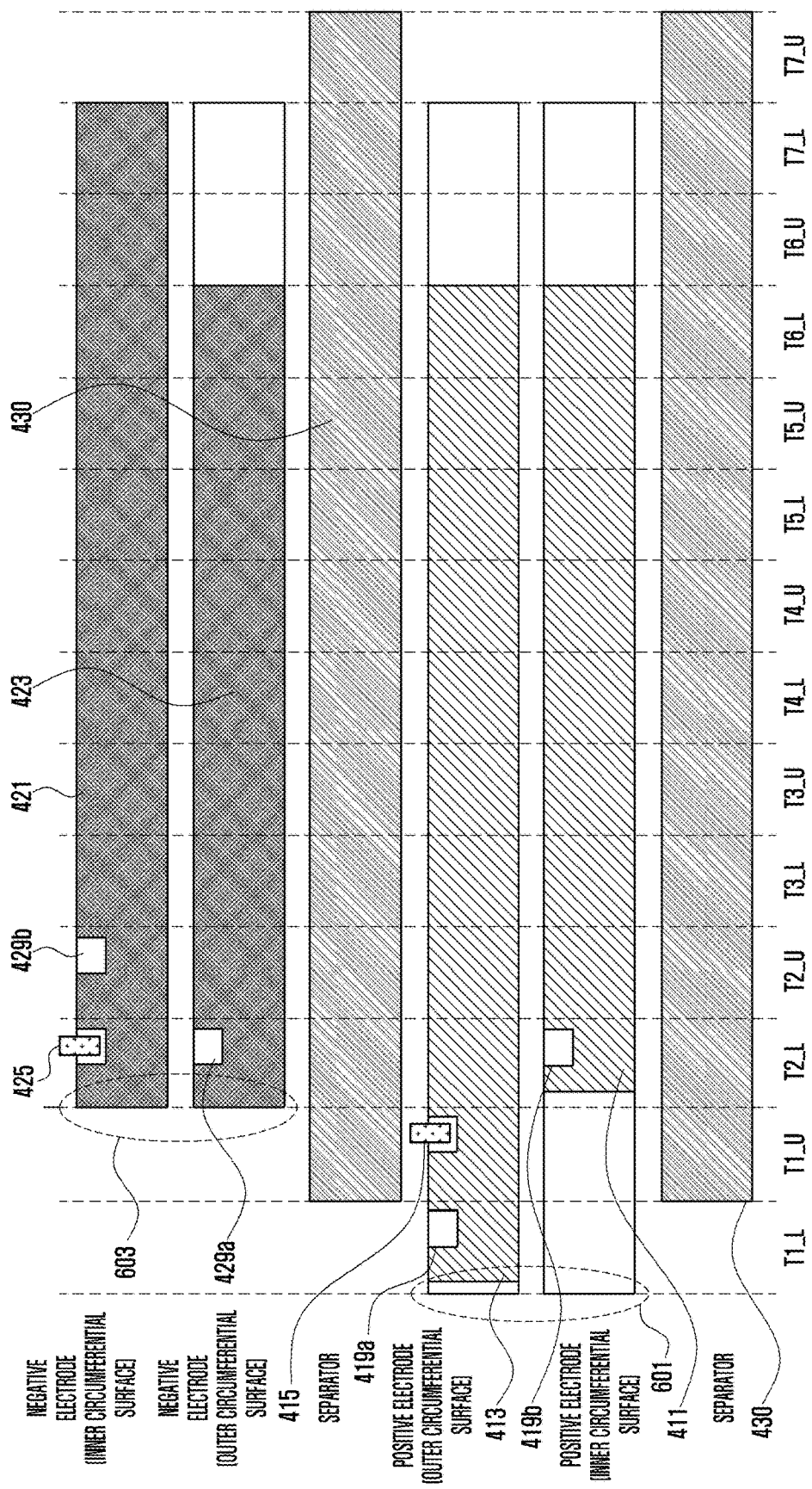
FIG. 6 is a cross-sectional view of an arrangement structure of an electrode assembly according to an embodiment of the present disclosure.

An end portion, such as an end portion 601 of FIG. 6 of a positive electrode substrate, of one direction of the positive electrode substrate and an end portion, such as an end portion 603 of FIG. 6 of the negative electrode substrate, of one direction of the negative electrode substrate may be non-overlappedly aligned.

The battery may further include a plurality of turn areas in which the positive electrode substrate, the separator, and the negative electrode substrate may be wound in a jelly-roll shape. The plurality of turn areas may include a first turn area T1, and a second turn area T2.

In the negative electrode substrate, in another turn area adjacent to a turn area in which the positive electrode tab is disposed in the plurality of turn areas, a first area may be formed in which the negative electrode active material is not coated.

A positive electrode active material may not be coated in a third area facing the negative electrode tab at the surface of the positive electrode substrate. A positive electrode active material may be coated in a fourth area, such as a second area 312b of FIG. 3, adjacent to the third area, such as a first area 312a of FIG. 3, in a length direction of the negative electrode tab at the surface of the positive electrode substrate.

Figure 20:
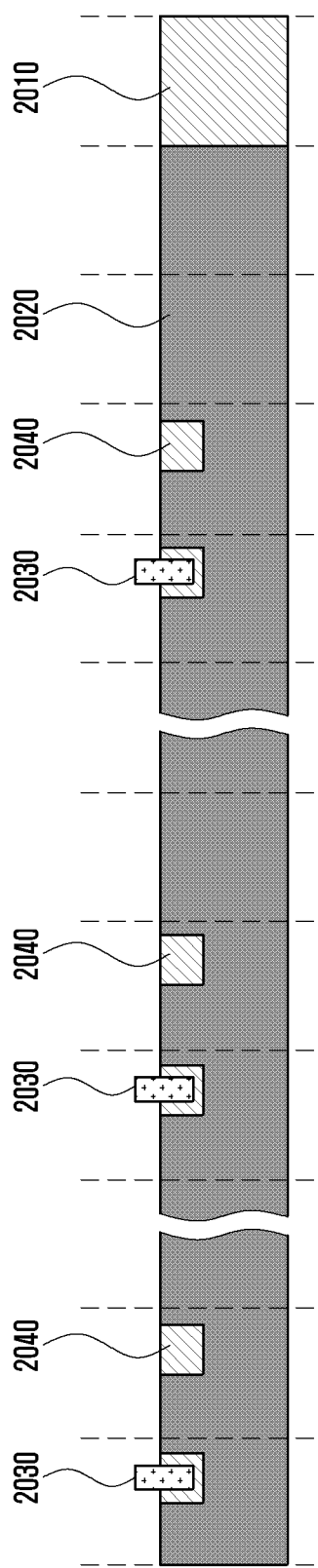
FIG. 20 is a top plan view of an unrolled surface of a positive electrode substrate or a negative electrode substrate according to an embodiment of the present disclosure.

A third area, such as a non-coated area 2040 of FIG. 20, may be formed in which the positive electrode active material is not coated in the positive electrode substrate, in another turn area adjacent to a turn area in which the negative electrode tab is disposed in the plurality of turn areas.

The negative electrode active material may not be coated in an area corresponding to the first area at an opposite surface of the surface of the negative electrode substrate.

Figure 9:
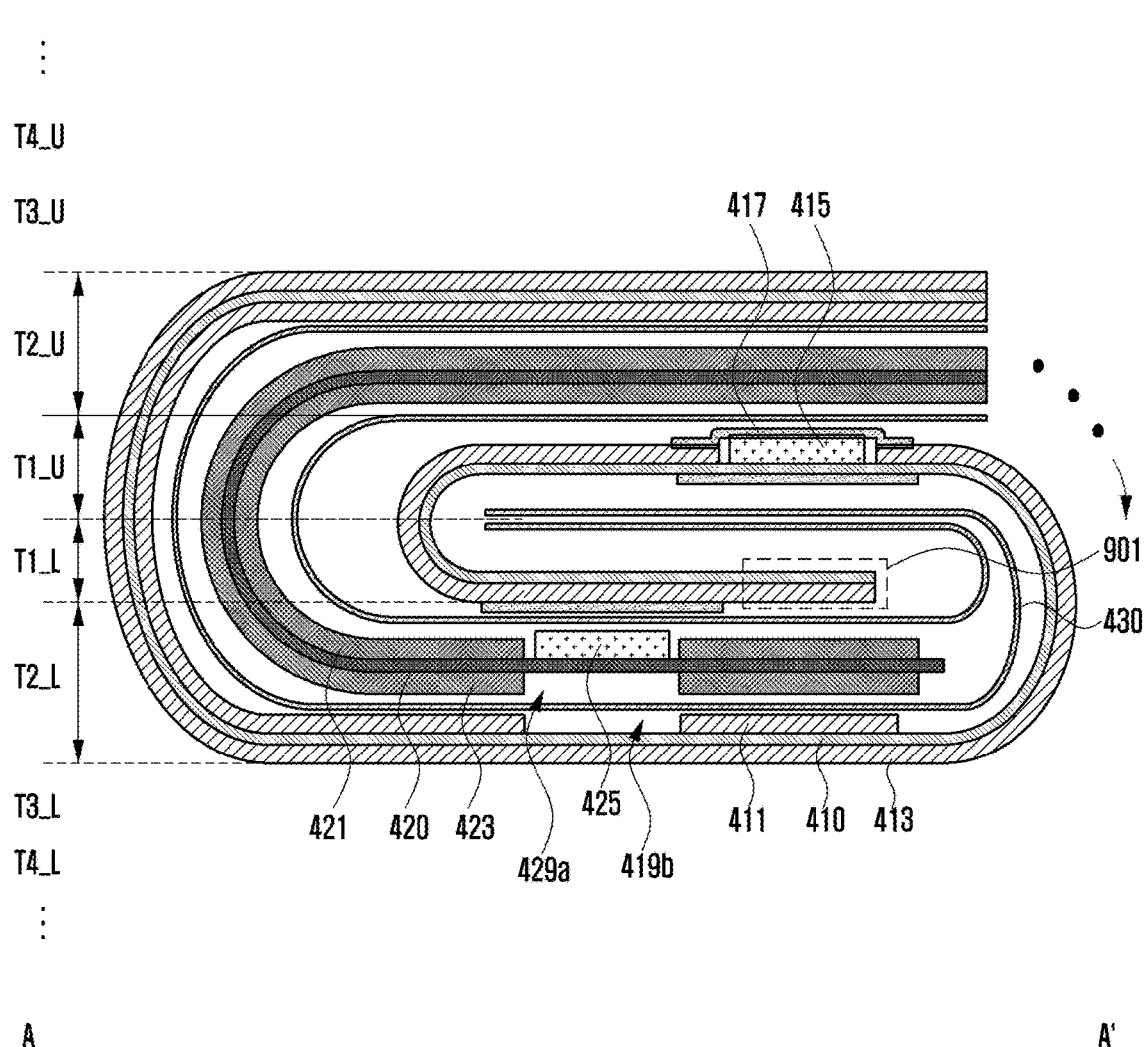
FIG. 9 is a cross-sectional view of a battery in an area in which a positive electrode tab and a negative electrode tab are attached according to another embodiment of the present disclosure.

The positive electrode tab may be attached to an inner circumferential surface or an outer circumferential surface of the positive electrode substrate in an upper area of the first turn area, and an ending portion, such as an overlapped area 901 of FIG. 9, of a lower area of the first turn area of the positive electrode substrate may be overlapped with the positive electrode tab.

At least a portion of the positive electrode tab may be covered with a first insulating tape, and at least a portion of the first insulating tape and the positive electrode active material may be covered with a second insulating tape.

A battery, according to various embodiments of the present disclosure, includes a positive electrode assembly including a positive electrode substrate, a positive electrode active material coated at one surface of the positive electrode substrate, and a positive electrode tab attached to the one surface; a negative electrode assembly including a negative electrode substrate, a negative electrode active material coated at one surface of the negative electrode substrate, and a negative electrode tab attached to the one surface of the negative electrode substrate; and a separator located between the positive electrode assembly and the negative electrode assembly, wherein in a first area facing the negative electrode tab at the one surface of the positive electrode substrate, the positive electrode active material is not coated, and in a second area adjacent to the first area in a length direction of the negative electrode tab at the one surface of the positive electrode substrate, the positive electrode active material is coated.

An end portion, such as an end portion 601 of FIG. 6 of a positive electrode substrate, of one direction of the positive electrode substrate and an end portion, such as an end portion 603 of a negative electrode substrate, of one direction of the negative electrode substrate may be non-overlappedly aligned.

The battery may further include a plurality of turn areas in which the positive electrode substrate, the separator, and the negative electrode substrate are wound in a jelly-roll shape, and the plurality of turn areas include a first turn area and a second turn area.

The first area may be formed in which the positive electrode active material is not coated in the positive electrode substrate, in another turn area adjacent to a turn area in which the negative electrode tab is disposed in the plurality of turn areas.

The negative electrode active material may not be coated in a third area facing the positive electrode tab at the surface of the negative electrode substrate, and the negative electrode active material may be coated in a fourth area adjacent to the third area in a length direction of the positive electrode tab at the surface of the negative electrode substrate.

The third area may be formed in the negative electrode substrate, in which the negative electrode active material is not coated in another turn area adjacent to a turn area in which the positive electrode tab is disposed in the plurality of turn areas.

The positive electrode active material may not be coated in an area corresponding to the first area at an opposite surface of the surface of the positive electrode substrate.

The negative electrode tab may be attached to an inner circumferential surface or an outer circumferential surface of the negative electrode substrate in an upper area of the first turn area, and an ending portion of a lower area of the first turn area of the negative electrode substrate may be overlapped with the negative electrode tab.

An electronic device, according to various embodiments of the present disclosure, includes a communication module; a processor; and a battery, wherein the battery includes a positive electrode assembly including a positive electrode substrate, a positive electrode active material coated at one surface of the positive electrode substrate, and a positive electrode tab attached to the one surface; a negative electrode assembly including a negative electrode substrate, a negative electrode active material coated at one surface of the negative electrode substrate, and a negative electrode tab attached to the one surface of the negative electrode substrate; and a separator located between the positive electrode assembly and the negative electrode assembly, wherein in a first area facing the positive electrode tab at the one surface of the negative electrode substrate, the negative electrode active material is not coated, and in a second area adjacent to the first area in a length direction of the positive electrode tab at the one surface of the negative electrode substrate, the negative electrode active material is coated.

The battery may further include a plurality of turn areas in which the positive electrode substrate, the separator, and the negative electrode substrate are wound in a jelly-roll shape, and the plurality of turn areas include a first turn area and a second turn area.

The first area may be formed in which the negative electrode active material is not coated in the negative electrode substrate, in another turn area adjacent to a turn area in which the positive electrode tab is disposed in the plurality of turn areas.

The negative electrode active material may not be coated in an area corresponding to the first area at an opposite surface of the surface of the negative electrode substrate.

The positive electrode tab may be attached to an inner circumferential surface or an outer circumferential surface of the positive electrode substrate in an upper area of the first turn area, and an ending portion of a lower area of the first turn area of the positive electrode substrate may be overlapped with the positive electrode tab.

Figure 1A:
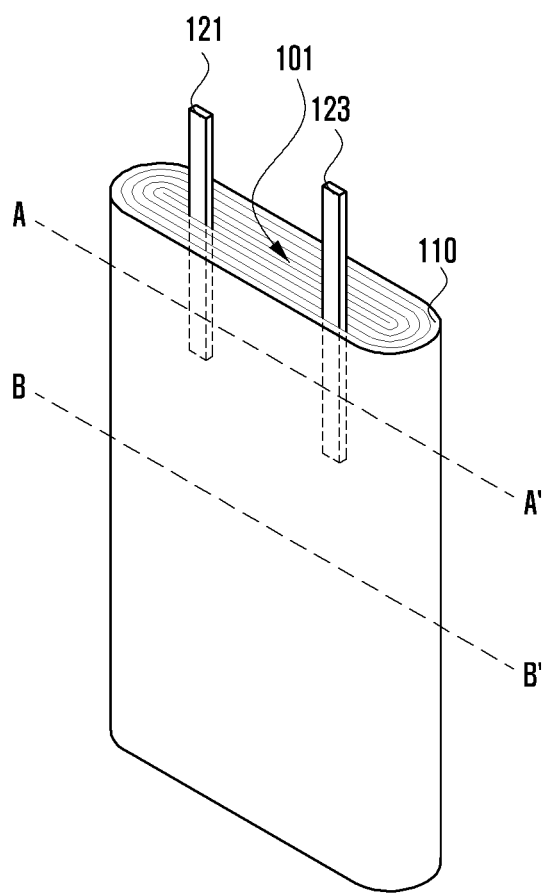
FIGS. 1A and 1B are perspective views of a battery according to various embodiments of the present disclosure.
Figure 1B:
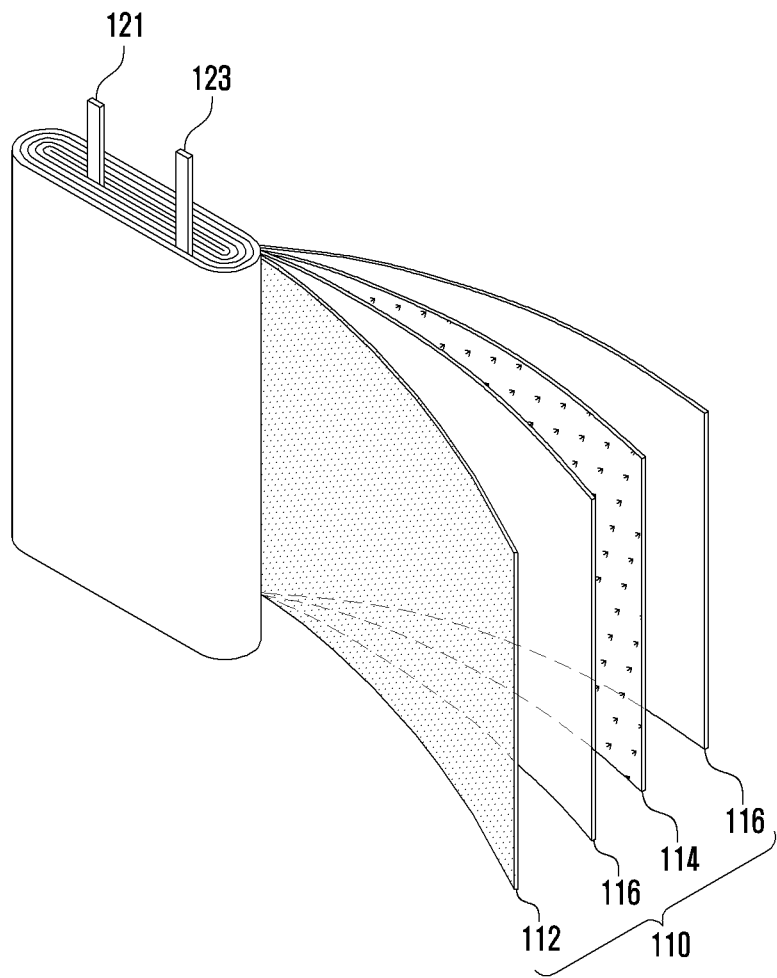

FIGS. 1A and 1B are perspective views of a battery according to various embodiments of the present disclosure.

With reference to FIGS. 1A and 1B, a battery 100 includes an electrode assembly 110 including a positive electrode assembly 112, a separator 116, and a negative electrode assembly 114, and the electrode assembly 110 may have a form sequentially wound from a central area 101 of the battery 100.

The positive electrode assembly 112 may include a positive electrode substrate, a positive electrode active material coated at one surface of the positive electrode substrate, and a positive electrode tab 121 attached to the one surface.

The negative electrode assembly 114 may include a negative electrode substrate, a negative electrode active material coated at one surface of the negative electrode substrate, and a negative electrode tab 123 attached to the one surface of a negative electrode substrate.

The separator 116 may be located between the positive electrode assembly and the negative electrode assembly.

The positive electrode substrate may be a metal formed with aluminum, stainless steel, titanium, copper, silver or a combination of materials selected from them. A positive electrode active material may be coated at a surface of the positive electrode substrate. The positive electrode active material may be coated at both surfaces of the positive electrode substrate.

The positive electrode active material may be made of a material capable of reversibly intercalating and deintercalating lithium ions and may include at least one of lithium transition metal oxides, such as lithium cobalt oxide, lithium nickel oxide, lithium nickel cobalt oxide, lithium nickel cobalt aluminum oxide, lithium nickel cobalt manganese oxide, lithium manganese oxide, and lithium iron phosphate, nickel sulfides, copper sulfides, sulfur, iron oxides, and vanadium oxides. The positive electrode active material may be coated at both surfaces of a positive electrode substrate.

A binder and a conductive agent may be further coated in addition to a positive electrode active material at a surface of the positive electrode substrate.

The binder may include at least one polyvinylidene fluoride-containing binder, such as polyvinylidene fluoride, vinylidene fluoride/hexafluoropropylene copolymer, vinylidene fluoride/tetrafluoroethylene copolymer, at least one carboxymethyl cellulose-containing binder, such as sodium-carboxymethyl cellulose and lithium-carboxymethyl cellulose, and at least one acrylate-containing binder, such as polyacrylic acid, lithium-polyacrylic acid, acrylic, polyacrylonitrile, polymethyl methacrylate, and polybutylacrylate. The binder may also include polyimide-imides, polytetrafluoroethylene, polyethylene oxide, polypyrrole, lithium-nafion, and styrene butadiene rubber-containing polymers.

The conductive agent may include at least one carbon-containing conducting agent, such as carbon black, carbon fiber, and graphite, at least one conductive fiber, such as metal fiber, at least one metal powder, such as carbon fluoride powder, aluminum powder, and nickel powder, at least one conductive whisker, such as zinc oxide and potassium titanate, at least one conductive metal oxide, such as titanium oxide, and at least one conductive polymer, such as polyphenylene derivatives.

The positive electrode tab 121 at an end portion of one side of the positive electrode substrate may be attached with an ultrasonic wave welding material. For example, the positive electrode tab 121 may be disposed at an end portion of one side in a length direction of the positive electrode substrate.

The end portion of one side of the positive electrode substrate to which the positive electrode tab 121 is attached may be disposed adjacent to a start point in which winding of the electrode assembly 110 is started. For example, the end portion of one side of the positive electrode substrate to which the positive electrode tab 121 is attached may be disposed adjacent to a central area 101 of the battery 100. Alternatively, the positive electrode tab 121 may include a plurality of positive electrode tabs 121, and the plurality of positive electrode tabs 121 may be disposed at a specific gap in a length direction of the positive electrode substrate.

The negative electrode substrate may include at least one metal, such as copper, stainless steel, nickel, aluminum, and titanium. A negative electrode active material may be coated at a surface of the negative electrode substrate. For example, the negative electrode active material may be coated at both surfaces of the negative electrode substrate.

The negative electrode active material may be capable of forming an alloy together with lithium or reversibly intercalating and deintercalating lithium. For example, the negative electrode active material may include at least one metal, such as carbon-containing materials, metal oxides, and lithium metal nitrides. The negative electrode active material may be coated at both surfaces of the negative electrode substrate.

The metals may include at least one of lithium, silicon, magnesium, calcium, aluminum, germanium, tin, lead, arsenic, antimony, bismuth, silver, gold, zinc, cadmium, mercury, copper, iron, nickel, cobalt and indium.

The carbon-containing materials may include at least one of graphite, graphite carbon fiber, coke, mesocarbon microbeads (MCMBS), polyacene, pitch-derived carbon fiber, and hard carbon.

The metallic oxides may include at least one of lithium titanium oxides, titanium oxides, molybdenum oxides, niobium oxides, iron oxides, tungsten oxides, tin oxides, amorphous tin oxide composites, silicon monoxide, cobalt oxides, and nickel oxides.

A binder and a conductive agent may be further coated, in addition to the negative electrode active material, at a surface of the negative electrode substrate. The binder and the conductive agent may be the same as or similar to a binder and a conductive agent coated at the positive electrode substrate.

The negative electrode tab 123 may be attached to an end portion of one side of the negative electrode substrate. For example, the negative electrode tab 123 may be disposed at an end portion of one side in a length direction of the negative electrode substrate.

An end portion of one side of the negative electrode substrate to which the negative electrode tab 123 is attached may be disposed adjacent to a start point in which winding of the electrode assembly 110 is started. For example, an end portion of one side of the negative electrode substrate to which the negative electrode tab 123 is attached may be disposed adjacent to the central area 101 of the battery 100. Alternatively, the negative electrode tab 123 may include a plurality of negative electrode tabs 123 and may be disposed at a specific gap in a length direction of the negative electrode substrate.

The separator 116 may be disposed between the positive electrode substrate and the negative electrode substrate to insulate the positive electrode substrate and the negative electrode substrate from each other. The separator 116 may be formed with a porous polymer membrane, such as a polyethylene membrane and a polypropylene membrane.

FIG. 2 is a top plan view of an unrolled surface of a positive electrode substrate or a negative electrode substrate according to an embodiment of the present disclosure.

In a positive electrode substrate 112 and a negative electrode substrate 114, an end portion of a substrate 210, such as the positive electrode substrate 112 or the negative electrode substrate 114, in which an electrode tab 230, such as a positive electrode tab 121 or a negative electrode tab 123, is formed and may be configured in a normal type in which an active material 220, such as a positive electrode active material or a negative electrode active material, is not coated.

FIG. 2 is a top plan view of one surface of the positive electrode substrate 112.

A positive electrode tab 230 may be attached to an end portion of one side of the positive electrode substrate 210, and at a periphery of an area to which the positive electrode tab 230 is attached.

A positive electrode active material 220 may not be coated. For example, in an end portion of both sides of the positive electrode substrate 210, a positive electrode non-coating area may be formed in which a positive electrode active material 220 is not coated; thus, a positive electrode active material 220 may not be coated in an end portion of one side of the positive electrode substrate 210 in which the positive electrode tab 230 is attached.

According to an embodiment, the electrode assembly 110 in which the positive electrode substrate 210, the separator, and the negative electrode substrate 114 are layered may be wound by a k number (k is an integer) from the central area 101 of the battery 100 and may include a first turn area T1 to a k-th turn area Tk, according to the winding number. For example, the first turn area T1 may be an area in which the electrode assembly 110 forms a first turn while being wound first, the second turn area T2 may be an area in which the electrode assembly 110 forms a second turn while enclosing an outer edge of the first turn area T1, and the k-th area Tk may be an area in which the electrode assembly 110 forms a k-th turn while being finally wound. In FIG. 2, a dotted line represented in a vertical direction may indicate an area in which the electrode assembly 110 is bent while being wound.

With reference to FIG. 2, a positive electrode non-coating area may be formed to correspond to a first turn area of the electrode assembly 110 in the positive electrode substrate 210, and may be formed to correspond to at least a portion of the k-th turn area of the electrode assembly 110.

In FIG. 2, one surface of the negative electrode substrate 114 is shown.

The negative electrode tab 230 may be attached to an end portion of one side of the negative electrode substrate 210, and at a periphery of an area to which the negative electrode tab 230 is attached.

The negative electrode active material 220 may not be coated. For example, a negative electrode non-coating area may be formed in which the negative electrode active material 220 is not coated in an end portion of both sides of the negative electrode substrate 210; thus, in an end portion of one side of the negative electrode substrate 210 to which the negative electrode tab 230 is attached, the negative electrode active material 220 may not be coated.

In the negative electrode substrate 210, a negative electrode non-coating area is formed to correspond to a first turn area of the electrode assembly 110, and a negative electrode non-coating area may be formed to correspond to at least a portion of a k-th turn area of the electrode assembly 110, as in the positive electrode substrate 112.

In general, when the battery 100 receives an external impact or is abnormally charged, a short circuit may occur in at least a partial area, causing a large unintended current to flow. When a large current flows to the positive electrode tab 121, a temperature of the positive electrode tab 121 increases; thus, the separator 116 at a periphery of the positive electrode tab 121 may be contracted or deformed by a heat of the positive electrode tab 121.

Further, when an external impact or an external pressure is applied, a deformation, such as tearing of the separator 116 may occur, because the positive electrode tab 121 or the negative electrode tab 123 forms a step in a substrate. When the separator 116 is contracted or deformed, at least a portion of the positive electrode substrate 112 and at least a portion of the negative electrode substrate 114 may be short-circuited. When the positive electrode tab 121 contacts a negative electrode active material, a safety accident, such as fire or explosion of the battery 100, may occur because of a rapid increase of current. In various embodiments of the present disclosure, in order to prevent a fire or explosion of the battery 100, a negative electrode non-coating area may be disposed to overlap with the positive electrode tab 121 in a state in which the electrode assembly 110 is wound, and a positive electrode non-coating area may overlap with the negative electrode tab 123.

By overlapping the negative electrode non-coating area with the positive electrode tab 121, even if a peripheral separator is deformed because of a heat occurring in the positive electrode tab 121 or a step by the positive electrode tab 121, the positive electrode tab 121 contacts a negative electrode non-coating area instead of a negative electrode active material; thus, a fire or explosion of the battery 100 may be prevented from occurring.

In various embodiments of the present disclosure, by disposing a positive electrode non-coating area to overlap with the negative electrode tab, even if deformation, such as tearing of the separator, occurs because of a step of the negative electrode tab, the negative electrode tab contacts a positive electrode non-coating area instead of a positive electrode active material; thus, a fire or explosion of the battery 100 may be prevented from occurring.

FIGS. 3A and 3B are top plan views of a positive electrode substrate or a negative electrode substrate according to another embodiment of the present disclosure. Specifically, FIG. 3A is a top plan view of an unrolled surface of a positive electrode substrate or a negative electrode substrate according to another embodiment of the present disclosure, and FIG. 3B is a changed form of a positive electrode non-coating area or a negative electrode non-coating area of FIG. 3A.

The positive electrode substrate 112 and the negative electrode substrate 114 according to another embodiment of the present disclosure may be an embedded tab structure (ETS) type in which an active material 320, such as a positive electrode active material or a negative electrode active material, is coated to an end portion of a substrate 310, such as the positive electrode substrate 112 or the negative electrode substrate 114, in which an electrode tab 330, such as the positive electrode tab 121 or the negative electrode tab 123 is formed. In the battery 100 in which the positive electrode substrate 112 or the negative electrode substrate 114 is configured in an extension type, a charge capacity may increase because an active material coating area increases, compared with the normal type of FIG. 2.

In FIG. 3A, one surface of the positive electrode substrate 112 is shown.

A positive electrode active material 320 is coated to an end portion of one side of a positive electrode substrate 310 to which the positive electrode tab 330 is attached and an attachment area in which the positive electrode tab 330 is attached. An area 311 enclosing the attachment area and an area 312a overlapping with or opposite to a negative electrode tab may be a positive electrode non-coating area in which the positive electrode active material 320 is not coated. For example, the first turn area T1 to which the positive electrode tab 330 is attached may be divided into a positive electrode non-coating area to which the positive electrode tab 330 is attached and the positive electrode active material 320 is not coated, and a positive electrode active material area in which the positive electrode active material 320 is coated.

According to various embodiments of the present disclosure, in a first turn area T1, the positive electrode non-coating areas 311 and 312a may include a tab peripheral area 311 disposed to enclose an area in which the positive electrode tab 330 is attached and a first area 312a disposed to overlap with or opposite to the negative electrode tab when winding the electrode assembly, such as the electrode assembly 110.

A width W2 of the tab peripheral area 311 and the first area 312a in a length direction (X direction in the drawing) of the positive electrode substrate 112 may be larger than a width W1 of the positive electrode tab 330 or the negative electrode tab. Alternatively, a height H1 of each of the tab peripheral area 311 and the first area 312a in a width direction (Y direction in the drawing) of the positive electrode substrate 112 may be smaller than a height H2 of a second area 312b in which an active material is coated adjacent to the first area 312a in a width direction.

For example, the first area 312a is a positive electrode non-coating area and is overlapped with or is opposite to a negative electrode tab when winding the electrode assembly and may have a second width W2 larger than the first width W1 of the negative electrode tab and have a first height H1 in a width direction of the positive electrode substrate 112. The tab peripheral area 311 is a positive electrode non-coating area and is positioned at an area to which the positive electrode tab 330 is attached, and may have the same width W2 and height H1 as a width W2 and height H1 as that of the first area 312a. The second area 312b is a positive electrode active material area in which a positive electrode active material is coated. The second area 312b is positioned adjacent to the first area 312a in a width direction of the positive electrode substrate 112 and may have the same second width W2 as that of the first area 312a and have a second height H2 larger than a first height H1 of the first area 312a. Alternatively, the first height H1 may be larger than the second height H2.

According to an embodiment of the present disclosure, an area in which a positive electrode active material area is added may be larger than that in which the positive electrode non-coating areas 311 and 312a are added in the first turn area T1; thus, a charge capacity of a battery can increase.

In FIG. 3A, one surface of the negative electrode substrate 114 is shown.

The negative electrode active material 320 may be coated to an end portion of one side of the negative electrode substrate 310 to which the negative electrode tab 330 is attached, as in the positive electrode active material, but an attachment area to which the negative electrode tab 330 is attached and an area 311 enclosing the attachment area may be a negative electrode non-coating area in which the negative electrode active material 320 is not coated.

For example, the first turn area T1 to which the negative electrode tab 330 is attached may be divided into a negative electrode non-coating area 311 in which the negative electrode tab 330 is attached and the negative electrode active material 320 is not coated, and a negative electrode active material area in which the negative electrode active material 320 is coated.

According to various embodiments of the present disclosure, the negative electrode non-coating areas 311 and 312a may include a tab peripheral area 311 disposed to enclose an area to which the negative electrode tab 330 is attached and a first area 312a disposed to overlap with or opposite to a positive electrode tab when winding the electrode assembly 110 in the first turn area T1.

A width W2 of the tab peripheral area 311 and the first area 312a in a length direction (X direction in the drawing) of the negative electrode substrate 114 may be larger than a width W1 of the negative electrode tab 330 or the positive electrode tab. Alternatively, a height H1 of the tab peripheral area 311 and the first area 312a in a width direction (Y direction in the drawing) of the negative electrode substrate 114 may be smaller than a height H2 of the second area 312b in which a negative electrode active material is coated adjacent to the first area 312a in a width direction.

For example, the first area 312a is a negative electrode non-coating area and is overlapped with or opposite to a positive electrode tab when winding the electrode assembly. The first area 312a may have a second width W2 larger than a first width W1 of the positive electrode tab and have a first height H1 in a width direction of the negative electrode substrate 114. The tab peripheral area 311 is a negative electrode non-coating area and is positioned in an area to which the negative electrode tab 330 is attached, and may have the same width W2 and height H1 as a width W2 and height H1 to that of the first area 312a. The second area 312b is a negative electrode active material area in which a negative electrode active material is coated. The second area 312b may be positioned adjacent to the first area 312a in a width direction of the negative electrode substrate 114 and may have a second width W2 the same as in the first area 312a, and may have a second height H2 larger than a first height H1 of the first area 312a. Alternatively, the first height H1 may be larger than the second height H2.

In the first turn area T1, an area in which a negative electrode active material is added may be larger than an area in which the negative electrode non-coating areas 311 and 312a are added; thus, in an embodiment of the present disclosure, a charge capacity of a battery can increase.

According to various embodiments of the present disclosure, a form of a positive electrode non-coating area or a negative electrode non-coating area may be variously changed, as shown in FIG. 3B.

The tab peripheral area 311 or the first area 312a may have a form of a circle or an oval. For example, the tab peripheral area 311 may be disposed to enclose the positive electrode tab 330, such as the positive electrode tab 121, or a negative electrode tab 340, such as the negative electrode tab 123 and may have a circular or oval form. Alternatively, the first area 312a may be disposed to enclose an overlapping area 330 of the positive electrode tab or an overlapping area 340 of the negative electrode tab and may have a circular or oval form.

The tab peripheral area 311 or the first area 312a may have a polygonal form, such as a triangle or oblique line form. For example, the tab peripheral area 311 may be disposed to enclose the positive electrode tab 330 or the negative electrode tab 340 and have a triangle form. Alternatively, the first area 312a may be disposed to enclose the overlapping area 330 of the positive electrode tab or the overlapping area 340 of the negative electrode tab and have a triangle form.

In at least a partial area of the tab peripheral area 311 or the first area 312a and the second area 312b adjacent in a width direction Y of the substrate 310, a third positive electrode non-coating area 350 or a third negative electrode non-coating area 350 may be formed in which an active material is not coated. A form or an area of the third positive electrode non-coating area 350 or the third negative electrode non-coating area 350 may have the same form or area as or a form or an area different from that of the tab peripheral area 311 or the first area 312a. The third positive electrode non-coating area 350 or the third negative electrode non-coating area 350 may be formed to correspond at a position overlapping with or opposite to another positive electrode tab, such as the positive electrode tab 121, or another negative electrode tab, such as the negative electrode tab 123 disposed at the lower end in a width direction.

In the tab peripheral area 311 or the first area 312a and the second area 312b adjacent in a width direction Y of the substrate 310, a boundary of a positive electrode non-coating area 360 and a positive electrode active material area 320 may have an oblique line form. Alternatively, in the second area 312b, a boundary of a negative electrode non-coating area 360 and a negative electrode active material area 320 may have an oblique line form.

Figure 4:
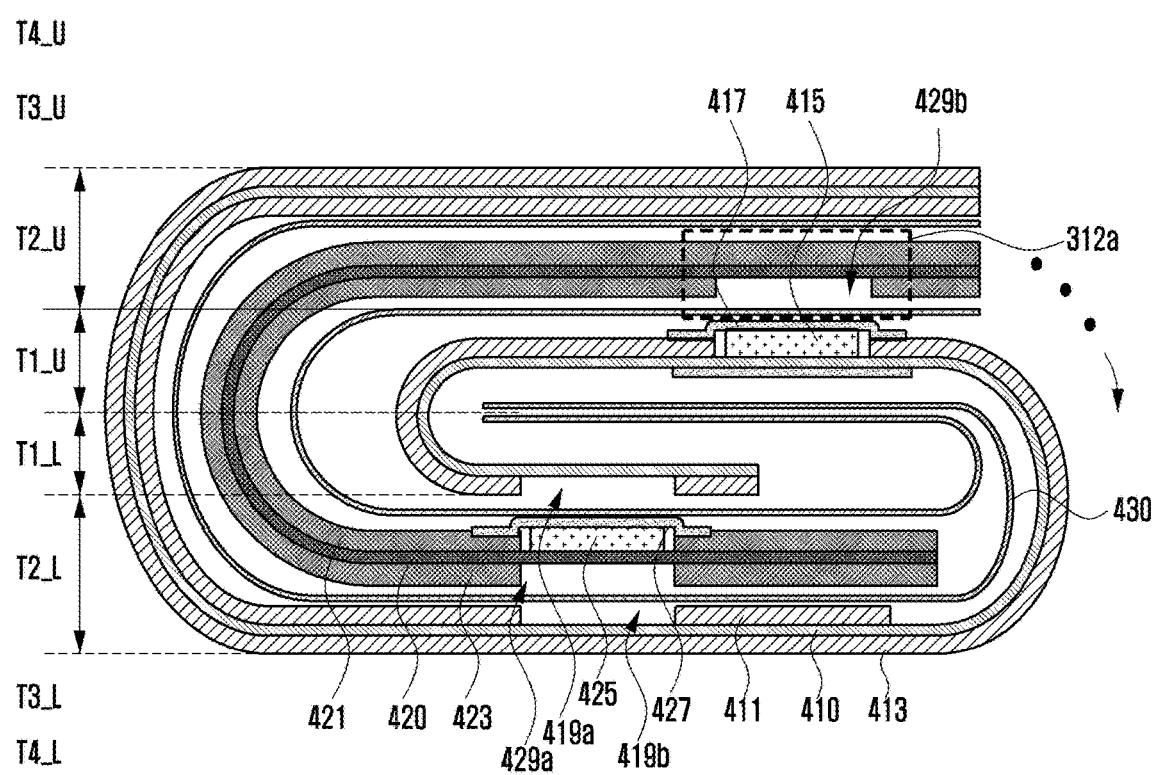
FIG. 4 is a cross-sectional view of a battery in an area in which a positive electrode tab and a negative electrode tab are attached according to an embodiment of the present disclosure.

FIG. 4 is a cross-sectional view of a battery 100 in an area in which a positive electrode tab and a negative electrode tab are attached according to an embodiment of the present disclosure. For example, In FIG. 4, a cross-sectional view of the battery 100 taken along line A-A' of FIG. 1A is shown.

In the electrode assembly 110 constituting the battery 100, a positive electrode substrate 410, a separator 430, and a negative electrode substrate 420 may be sequentially wound from the central area 101 of the battery 100. In the positive electrode substrate 410, positive electrode active materials 411 and 413 may include a first positive electrode active material 411 coated at an inner circumferential surface of the positive electrode substrate 410 and a second positive electrode active material 413 coated at an outer circumferential surface of the positive electrode substrate 410. At the negative electrode substrate 420, negative electrode active materials 421 and 423 may include a first negative electrode active material 421 coated at an inner circumferential surface of the negative electrode substrate 420 and a second negative electrode active material 423 coated at an outer circumferential surface of the negative electrode substrate 420.

When the electrode assembly 110 is wound, the turn area may be divided into a first turn area T1 forming a first turn, a second turn area T2 forming a second turn, a third turn area T3 forming a third turn, . . . , a k-th turn area Tk forming a k-th turn. In a cross-section of the electrode assembly 110 of a winding state, the turn areas T1-Tk each may be divided into an upper area and a lower area. For example, in the cross-section, the first turn area T1 may be divided into a first turn upper area T1_U disposed at a relatively upper portion and a first turn lower area T1_L disposed at a relatively lower portion. In the cross-section, the second turn area T2 may be divided into a second turn upper area T2_U disposed at a relatively upper portion and a second turn lower area T2_L disposed at a relatively lower portion. In the cross-section, the third turn area T3 may be divided into a third turn upper area T3_U disposed at a relatively upper portion and a third turn lower area T3_L disposed at a relatively lower portion, and the fourth turn area T4 or subsequent turn areas may be similar to the illustration.

When starting winding of the electrode assembly 110 from the first turn lower area T1_L, the first turn upper area T1_U may be bent at one side to be connected to the second turn lower area T2_L, and the second turn upper area T2_U may be bent at the one side to be connected to the third turn lower area T3_L, and the fourth turn lower area T4_L or subsequent turn areas may be similar to the illustration. Alternatively, when starting winding of the electrode assembly 110 from the first turn upper area T1_U, the first turn lower area T1_L may be bent at one side to be connected to the second turn upper area T2_U, and the second turn lower area T2_L may be bent at the one side to be connected to the third turn upper area T3_U, and the fourth turn lower area T4_L or subsequent turn areas may be similar to the illustration. For example, winding of the electrode assembly 110 is started from the first turn lower area T1_L.

A positive electrode tab 415 may be attached on the positive electrode substrate 410, and an insulating tape 417 may be attached on the positive electrode tab 415. The insulating tape 417 may insulate the positive electrode tab 415, and the positive electrode tab 415 may directly contact the separator 430 to prevent the separator 430 from becoming deformed or damaged.

A negative electrode tab 425 may be attached on the negative electrode substrate 420, and an insulating tape 427 may be attached on the negative electrode tab 425. The insulating tape 427 may insulate the negative electrode tab 425, and the negative electrode tab 425 may directly contact the separator 430 to prevent the separator 430 from becoming deformed or damaged.

When the electrode assembly 110 is wound, in a facing portion or an overlapping portion of the positive electrode tab 415 or the negative electrode tab 425, negative electrode non-coating areas 429a and 429b or positive electrode non-coating areas 419a and 419b may be formed.

The negative electrode non-coating areas 429a and 429b or the positive electrode non-coating areas 419a and 419b compensate for a step occurring by the positive electrode tab 415 or the negative electrode tab 425, and when the electrode assembly 110 is wound, the negative electrode non-coating areas 429a and 429b or the positive electrode non-coating areas 419a and 419b may prevent the separator 430 from being deformed or damaged because of a step of the positive electrode tab 415 or the negative electrode tab 425, thereby preventing a fire or explosion of the battery 100 from occurring.

The positive electrode tab 415 may be disposed at an outer circumferential surface of the positive electrode substrate 410 in the first turn upper area T1_U and opposite to an inner circumferential surface of the negative electrode substrate 420 disposed at the second turn upper area T2_U. The negative electrode non-coating area 429b may be formed opposite to the positive electrode tab 415 in the second turn upper area T2_U at an inner circumferential surface of the negative electrode substrate 420. For example, in the second turn upper area T2_U, the negative electrode non-coating area 429b formed at an inner circumferential surface of the negative electrode substrate 420, such as the first area 312a of FIG. 3A. Alternatively, the negative electrode non-coating area 429a may be formed to overlap with the negative electrode tab 425 in the second turn lower area T2_L at an outer circumferential surface of the negative electrode substrate 420. An area of the negative electrode non-coating areas 429a and 429b may be larger than or equal to that of the positive electrode tab 415 or the negative electrode tab 425.

The negative electrode tab 425 may be disposed at an inner circumferential surface of the negative electrode substrate 420 in the second turn lower area T2_L, opposite to an outer circumferential surface of the positive electrode substrate 410 disposed at the first turn lower area T1_L, and overlapped with an inner circumferential surface of the positive electrode substrate 410 disposed at the second turn lower area T2_L. The positive electrode non-coating areas 419a and 419b may be formed to overlap with the negative electrode tab 425 at an outer circumferential surface of the positive electrode substrate 410 disposed at the first turn lower area T1_L and an inner circumferential surface of the positive electrode substrate 410 disposed at the second turn lower area T2_L. An area of the positive electrode non-coating areas 419a and 419b may be greater than or equal to that of the negative electrode tab 425.

Figure 5:
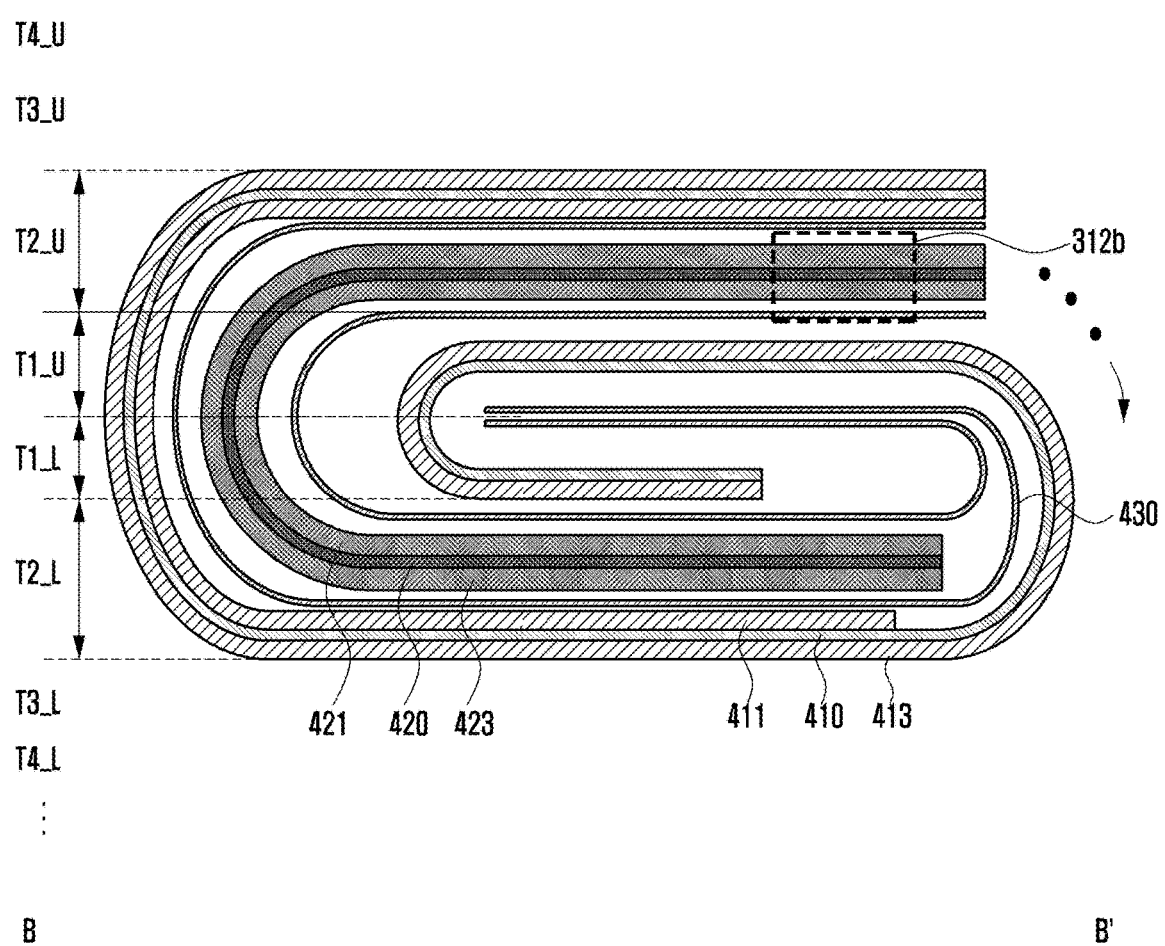
FIG. 5 is a cross-sectional view of a battery in an area in which a positive electrode tab and a negative electrode tab are not attached according to an embodiment of the present disclosure.

FIG. 5 is a cross-sectional view of a battery 100 in an area in which the positive electrode tab 415 and the negative electrode tab 425 are not attached according to an embodiment of the present disclosure. For example, in FIG. 5, a cross-sectional view illustrating the battery 100 taken along line B-B' of FIG. 1A is shown.

Negative electrode active materials 421 and 423 or positive electrode active materials 411 and 413 may be coated in the electrode assembly 110 in an area, except for a partial area to which the positive electrode tab 415 and the negative electrode tab 425 are attached.

For example, a negative electrode active material 421 may be coated when the positive electrode tab 415 is disposed at an outer circumferential surface of the positive electrode substrate 410 in the first turn upper area T1_U, at an inner circumferential surface of the negative electrode substrate 420 disposed in the second turn upper area T2_U opposite to the positive electrode tab 415, in an area, except for a partial area overlapped with the positive electrode tab 415.

Alternatively, the positive electrode active materials 411 and 413 may be coated in an area, except for a partial area opposite to or overlapped with the negative electrode tab 425 when the negative electrode tab 425 is disposed at an inner circumferential surface of the negative electrode substrate 420 in the second turn lower area T2_L, at an outer circumferential surface of the positive electrode substrate 410 disposed at the first turn lower area T1_L and an inner circumferential surface of the positive electrode substrate 410 disposed at the second turn lower area T2_L. For example, in the second turn upper area T2_U, an area designated by reference numeral 312b is the second area 312b of FIG. 3C.

In order to compensate for a step of the positive electrode tab 415 or the negative electrode tab 425, a coating area of an active material increases by disposing the negative electrode non-coating areas 429a and 429b and the positive electrode non-coating areas 419a and 419b in a partial area opposite to or overlapping with the positive electrode tab 415 or the negative electrode tab 425 while forming the negative electrode non-coating areas 429a and 429b and the positive electrode non-coating areas 419a and 419b, thereby increasing a capacity of the battery 100.

FIG. 6 is a cross-sectional view of an arrangement structure of an electrode assembly 110 according to an embodiment of the present disclosure.

An arrangement structure of the electrode assembly 110 may have an alignment for disposing the negative electrode non-coating areas 429a and 429b or the positive electrode non-coating areas 419a and 419b in a facing portion or an overlapping portion of the positive electrode tab 415 or the negative electrode tab 425 when winding the electrode assembly 110. An arrangement structure and a layered structure of the electrode assembly 110 will be described with reference to FIGS. 4 and 6.

An arrangement structure of the electrode assembly 110 may have a form in which positions of each end portion, such as an end portion 601 of a positive electrode substrate and an end portion 603 of a negative electrode substrate, of the positive electrode substrate 410 and the negative electrode substrate 420 do not correspond. For example, the electrode assembly 110 may be aligned such that the turn number of the positive electrode substrate 410 is one time larger than that of the negative electrode substrate 420. The positive electrode substrate 410 may be shifted and disposed from the negative electrode substrate 420 to one side by a length corresponding to the first turn area T1, and the positive electrode tab 415 may be attached to an outer circumferential surface to correspond to the first turn upper area T1_U.

A negative electrode non-coating area overlapped with the positive electrode tab may be an formed when the positive electrode tab is disposed at an n-th turn area, in the negative electrode substrate, in a portion of an (n−1)th turn area and/or an area forming an (n+1)th turn of the electrode assembly. The positive electrode non-coating area overlapped with a negative electrode tab may be formed when the negative electrode tab is disposed at an m-th turn area, in the positive electrode substrate, in a portion of an (m+1)th turn area and/or an area forming an (m−1)th turn of the electrode assembly.

For example, a positive electrode non-coating area 419a is formed at an outer circumferential surface of the positive electrode substrate 410, in an area in which the positive electrode tab 415 is attached in the first turn upper area T1_U and an area overlapped with the negative electrode tab 425 in the first turn lower area T1_L, and the remaining areas may be coated with a second positive electrode active material 413. A first positive electrode active material 411 may be coated from the second turn area T2 in an inner circumferential surface of the positive electrode substrate 410. A positive electrode non-coating area 419b is formed in a portion of the second turn lower area T2_L because an inner circumferential surface of the positive electrode substrate 410 is overlapped with the negative electrode tab 425 in the second turn lower area T2_L, and a first positive electrode active material 411 may be coated in the remaining areas.

The negative electrode substrate 420 may be aligned to wind from an area corresponding to the second turn area T2, and the negative electrode tab 425 may be attached to an inner circumferential surface thereof to correspond to the second turn lower area T2_L. A negative electrode non-coating area 429b may be formed at an inner circumferential surface of the negative electrode substrate 420, in an area to which the negative electrode tab 425 is attached in the second turn lower area T2_L and an area opposite to the positive electrode tab 415 in the second turn upper area T2_U, and the remaining areas may be coated with a first negative electrode active material 421. A negative electrode non-coating area 429a may be formed at an outer circumferential surface of the negative electrode substrate 420, in a partial area overlapped with the negative electrode tab 425 in the second turn lower area T2_L, and the remaining areas may be coated with a second negative electrode active material 423.

Figure 7:
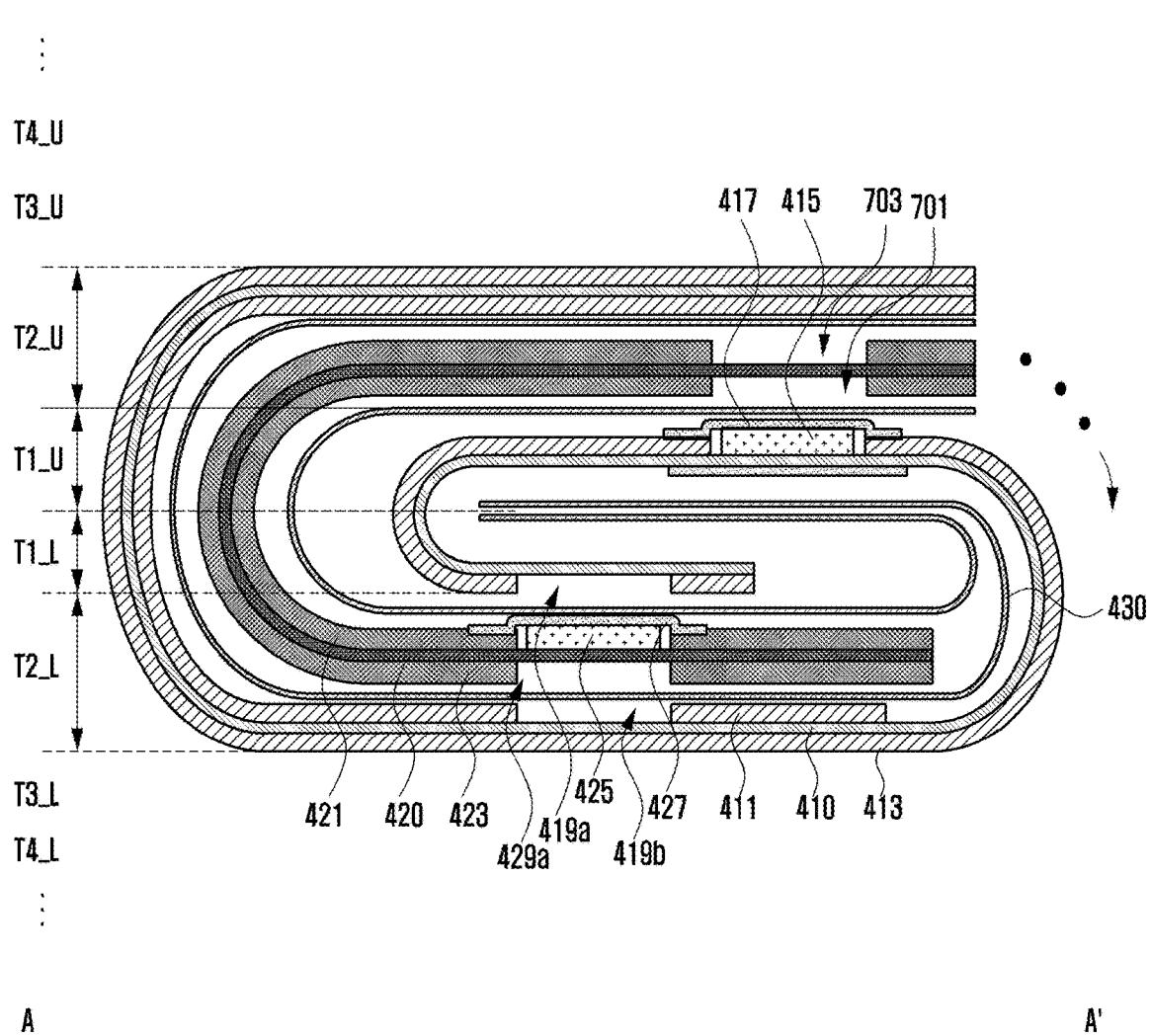
FIG. 7 is a cross-sectional view of a battery in an area in which a positive electrode tab and a negative electrode tab are attached according to another embodiment of the present disclosure.

FIG. 7 is a cross-sectional view of a battery 100 in an area in which a positive electrode tab and a negative electrode tab are attached according to another embodiment of the present disclosure. In FIG. 7, a cross-sectional view of the battery 100 taken along line A-A' of FIG. 1A is shown.

Unlike the electrode assembly 110 of FIG. 4, negative electrode non-coating areas 701 and 703 may be formed in the electrode assembly 110 of FIG. 7 at an outer circumferential surface and an inner circumferential surface in which the negative electrode substrate 420 is opposite to the positive electrode tab 415. For example, a negative electrode non-coating area 701 may be formed at an inner circumferential surface of the negative electrode substrate 420, in a portion of the second turn upper area T2_U opposite to the positive electrode tab 415. A negative electrode non-coating area 703 may be formed at an outer circumferential surface of the negative electrode substrate 420, in a portion of the second turn upper area T2_U opposite to the positive electrode tab 415.

By forming the negative electrode non-coating areas 701 and 703 at both an inner circumferential surface and outer circumferential surface of the negative electrode substrate 420 in an area overlapped with the positive electrode tab 415, damage of a separator and a short failure are prevented because of a step of the positive electrode tab 415; thus, battery safety is further enhanced.

Figure 8:
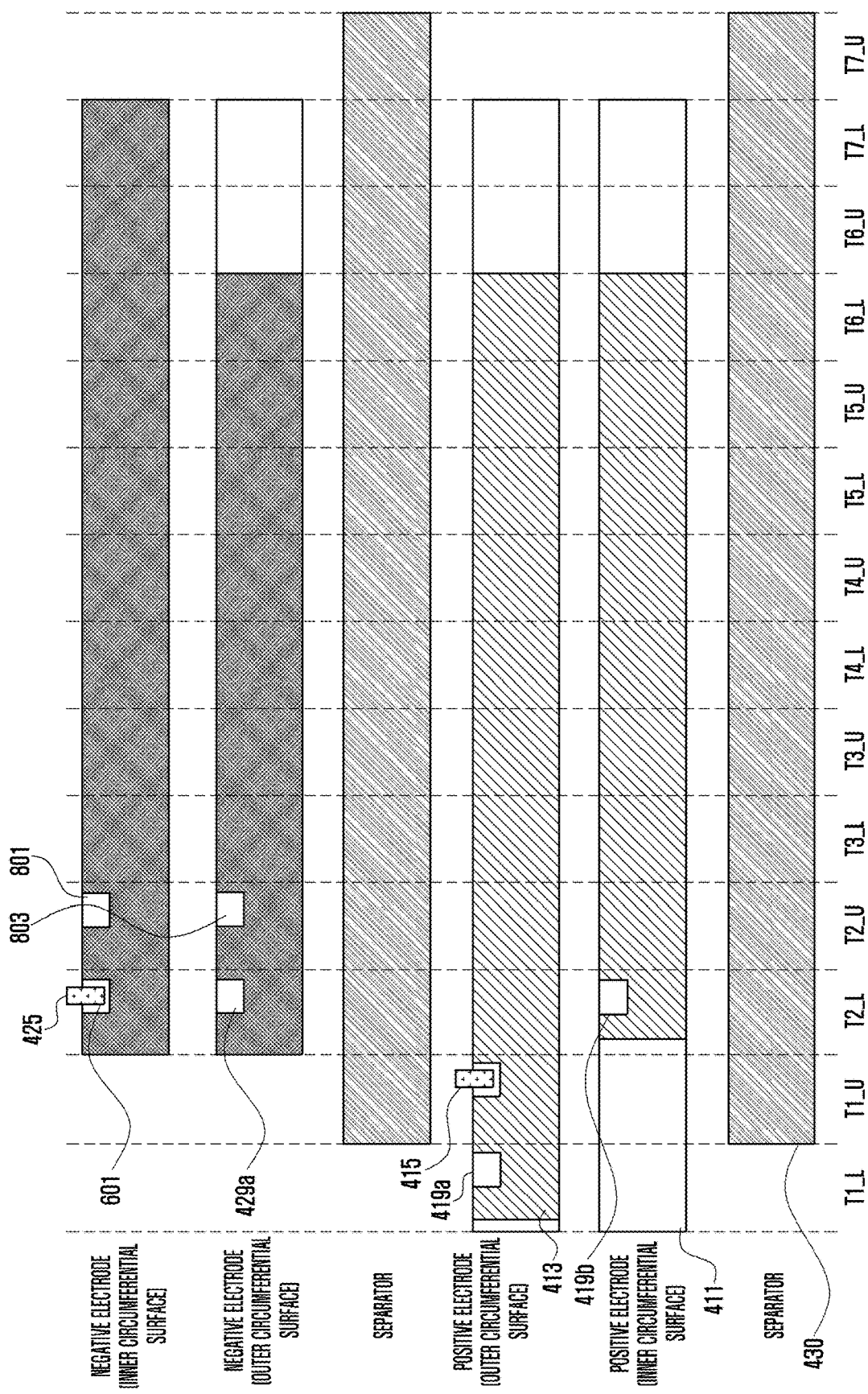
FIG. 8 is a cross-sectional view of an arrangement structure of an electrode assembly according to an embodiment of the present disclosure.

FIG. 8 is a cross-sectional view of an arrangement structure of an electrode assembly 110 according to an embodiment of the present disclosure.

When the electrode assembly 110 is wound, an arrangement structure of the electrode assembly 110 of FIG. 8 may be in an alignment for disposing the negative electrode non-coating areas 701 and 703 or the positive electrode non-coating areas 419a and 419b at a facing portion or an overlapping portion of the positive electrode tab 415 or the negative electrode tab 425, as shown in FIG. 7.

Unlike an arrangement structure of the electrode assembly 110 of FIG. 6, in an arrangement structure of the electrode assembly 110 of FIG. 8, a negative electrode non-coating area 801, such as the negative electrode non-coating area 429b, may be formed at an inner circumferential surface and a negative electrode non-coating area 803 may be formed at an outer circumferential surface to correspond to the second turn upper area T2_U.

FIG. 9 is a cross-sectional view of a battery 100 in an area in which a positive electrode tab and a negative electrode tab are attached according to another embodiment of the present disclosure. For example, FIG. 9 is a cross-sectional view illustrating the battery 100 taken along line A-A' of FIG. 1A.

Unlike the electrode assembly 110 of FIG. 4, an electrode assembly 110 of FIG. 9 may be extended to an area 901 in which an end portion of one side of the positive electrode substrate 410, in which a positive electrode active material is coated, is overlapped with the positive electrode tab 415. For example, when the positive electrode tab 415 is disposed at the first turn upper area T1_U, pressure due to a step of the positive electrode tab 415 damages the separator 430; thus, the positive electrode tab 415 directly contacts the negative electrode active material 421 of an upper portion or a lower portion of the positive electrode tab 415, and a fire or explosion may occur. The positive electrode tab 415 contacts the positive electrode substrate 410 of the same polarity overlapped at a lower portion instead of the negative electrode substrate 420 because an end portion of one side of the positive electrode substrate 410 coated with a positive electrode active material is extended to an area overlapped with the positive electrode tab 415, thus a fire or explosion may be prevented even if the separator 430 is damaged because of a step of the positive electrode tab 415.

Figure 10:
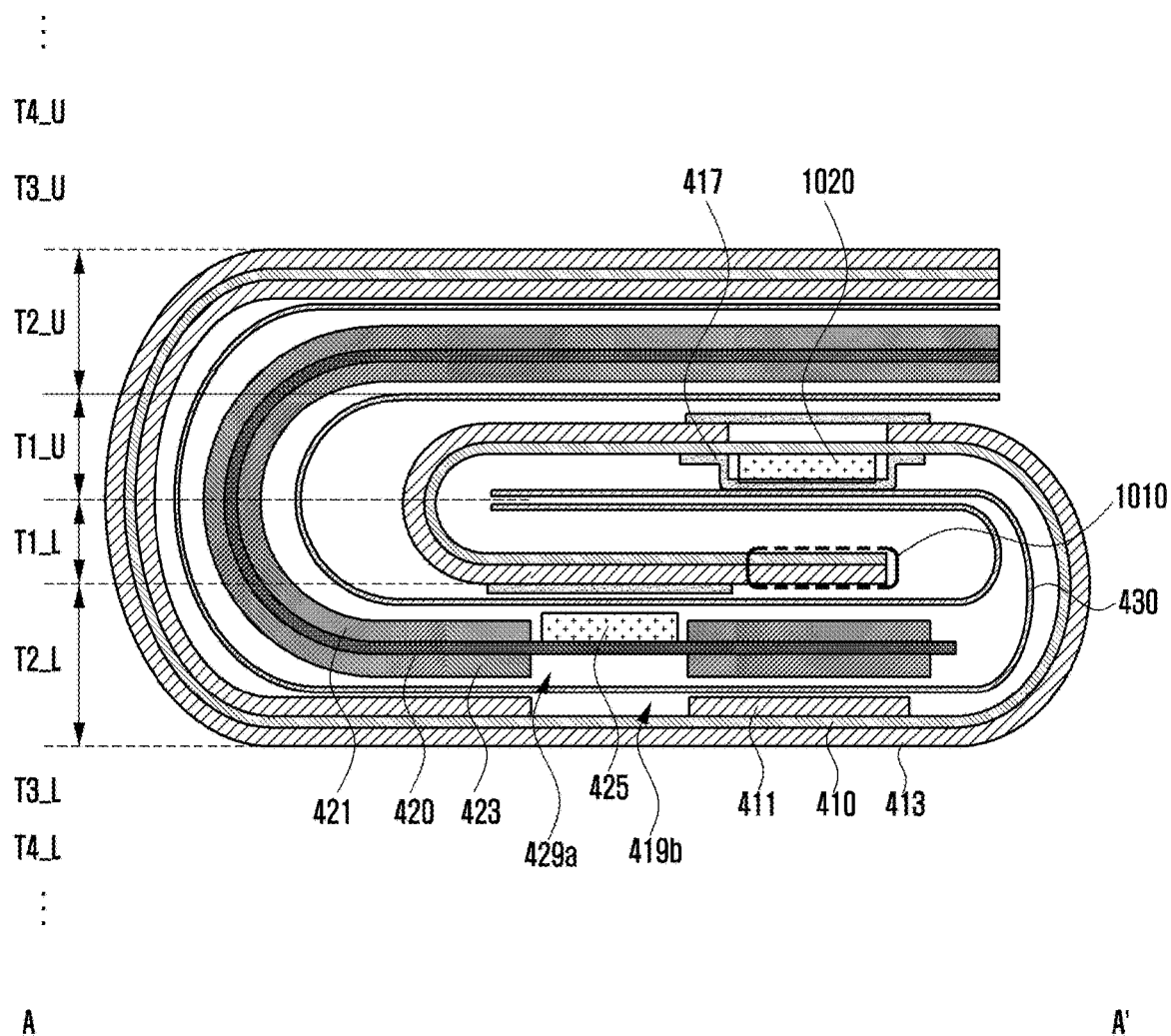
FIG. 10 is a cross-sectional view in which a structure of a battery is changed according to another embodiment of the present disclosure.

FIG. 10 is a cross-sectional view in which a structure of a battery 100 is changed according to another embodiment of the present disclosure. For example, in FIG. 10, a cross-sectional view illustrating the battery 100 taken along line A-A' of FIG. 1A is shown.

Unlike the electrode assembly 110 of FIG. 9, in an electrode assembly 110, a positive electrode tab 1020, such as the positive electrode tab 415, may be attached to an inner circumferential surface of the positive electrode substrate 410, and a pressure due to a step of the positive electrode tab 1020 may be reduced in the negative electrode substrate 420 positioned at an outer edge (upper portion) of the positive electrode tab 1020. However, because the positive electrode tab 1020 is attached to an inner circumferential surface, a pressure toward a lower portion of the positive electrode tab 1020 increases; thus, an end portion 1010 of one side of the positive electrode substrate 410 coated with a positive electrode active material, such as a positive electrode active material 411 or 413, may be extended to an area overlapped with the positive electrode tab 1020.

Figure 11:
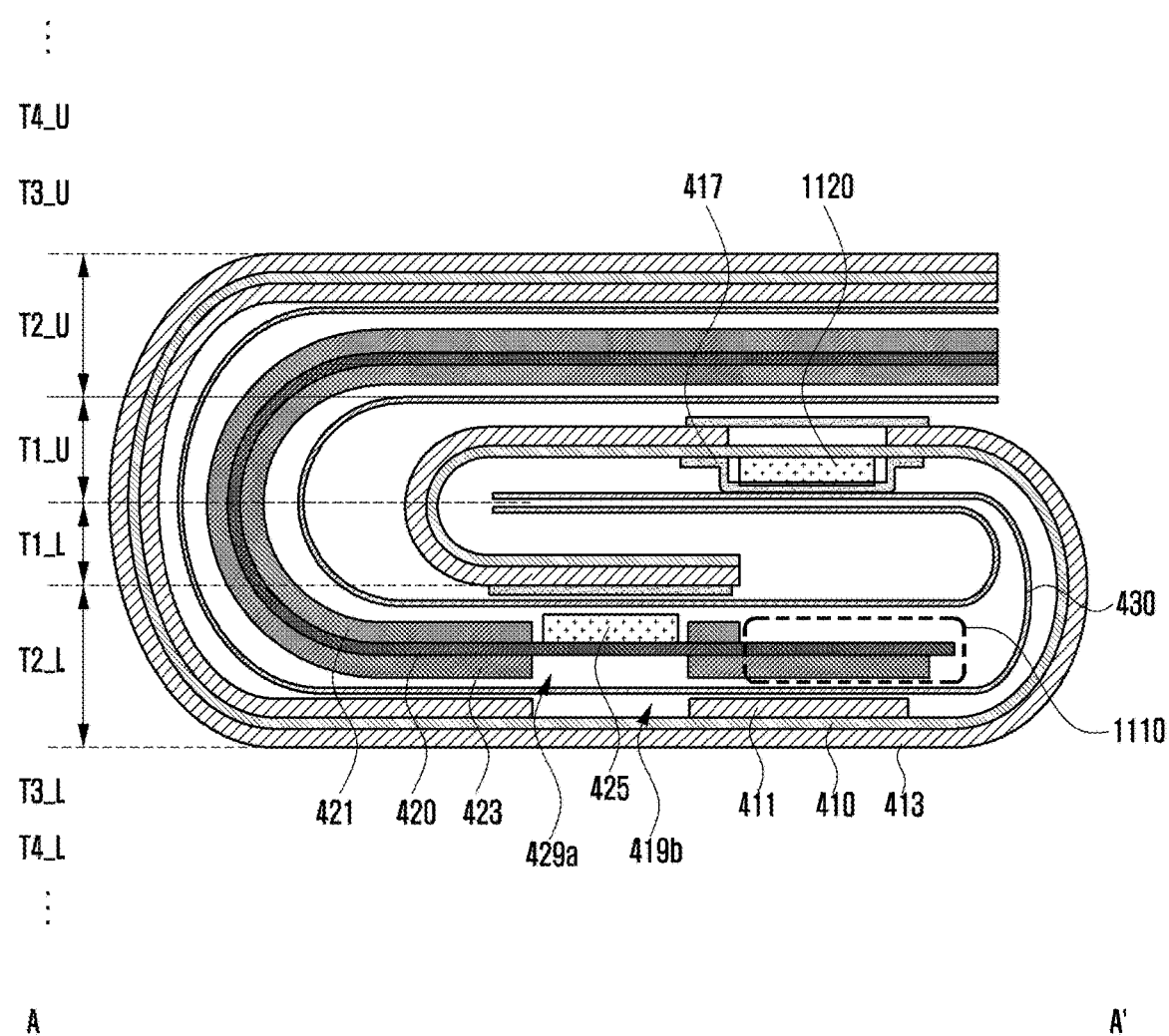
FIG. 11 is a cross-sectional view in which a structure of a battery is changed according to another embodiment of the present disclosure.

FIG. 11 is a cross-sectional view in which a structure of a battery 100 is changed according to another embodiment of the present disclosure. For example, in FIG. 11, a cross-sectional view illustrating the battery 100 taken along line A-A' of FIG. 1A is shown.

Unlike the electrode assembly 110 of FIG. 9, in an electrode assembly 110 of FIG. 11, a positive electrode tab 1120, such as the positive electrode tab 415, may be attached to an inner circumferential surface of the positive electrode substrate 410, and a pressure due to a step of the positive electrode tab 1120 may be reduced in the negative electrode substrate 420 positioned at an outer edge (upper portion) of the positive electrode tab 1120. However, because the positive electrode tab 1120 is attached to an inner circumferential surface, a pressure applying to a lower portion of the positive electrode tab 1120 increases in an end portion 1110 of one side of the negative electrode substrate 420, and a negative electrode non-coating area may be formed in which a negative electrode active material is not coated at an inner circumferential surface overlapped with a lower portion of the positive electrode tab 415. For example, an end portion area of an inner circumferential surface of the negative electrode substrate 420 is overlapped with a lower portion of the positive electrode tab 415 when the positive electrode tab 1120 is attached to an inner circumferential surface of the positive electrode substrate 410 in the first turn upper area T1_U, in the first turn lower area T1_L; thus, a negative electrode non-coating area 1110 may be formed. However, a negative electrode active material 423 may be coated in an area overlapped with a lower portion of the positive electrode tab 415, at an outer circumferential surface of the negative electrode substrate 420.

Figure 12:
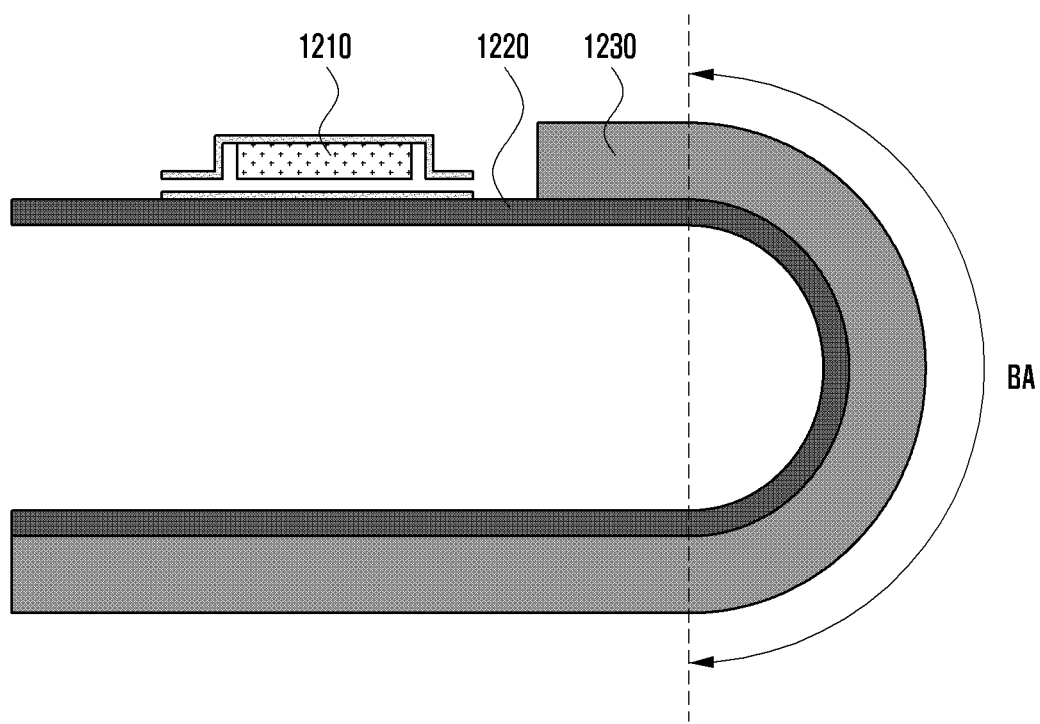
FIG. 12 is a cross-sectional view of a portion of a negative electrode substrate or a positive electrode substrate according to an embodiment of the present disclosure.

FIG. 12 is a cross-sectional view of a portion of a negative electrode substrate or a positive electrode substrate according to an embodiment of the present disclosure.

When the battery 100 is configured as the same type as or a similar type to that of FIG. 2, an active material 1230, such as the positive electrode active material 411 or 413 or the negative electrode active material 421 or 423, may be extended to an area in which a substrate 1220 is bent to which an electrode tab 1210, such as the positive electrode tab 121 or the negative electrode tab 123, is attached. Even in an area in which the substrate 1220 is bent, the active material 1230 may be prevented from separating and a capacity of the battery 100 can increase when the active material 1230 is coated.

Figure 13:
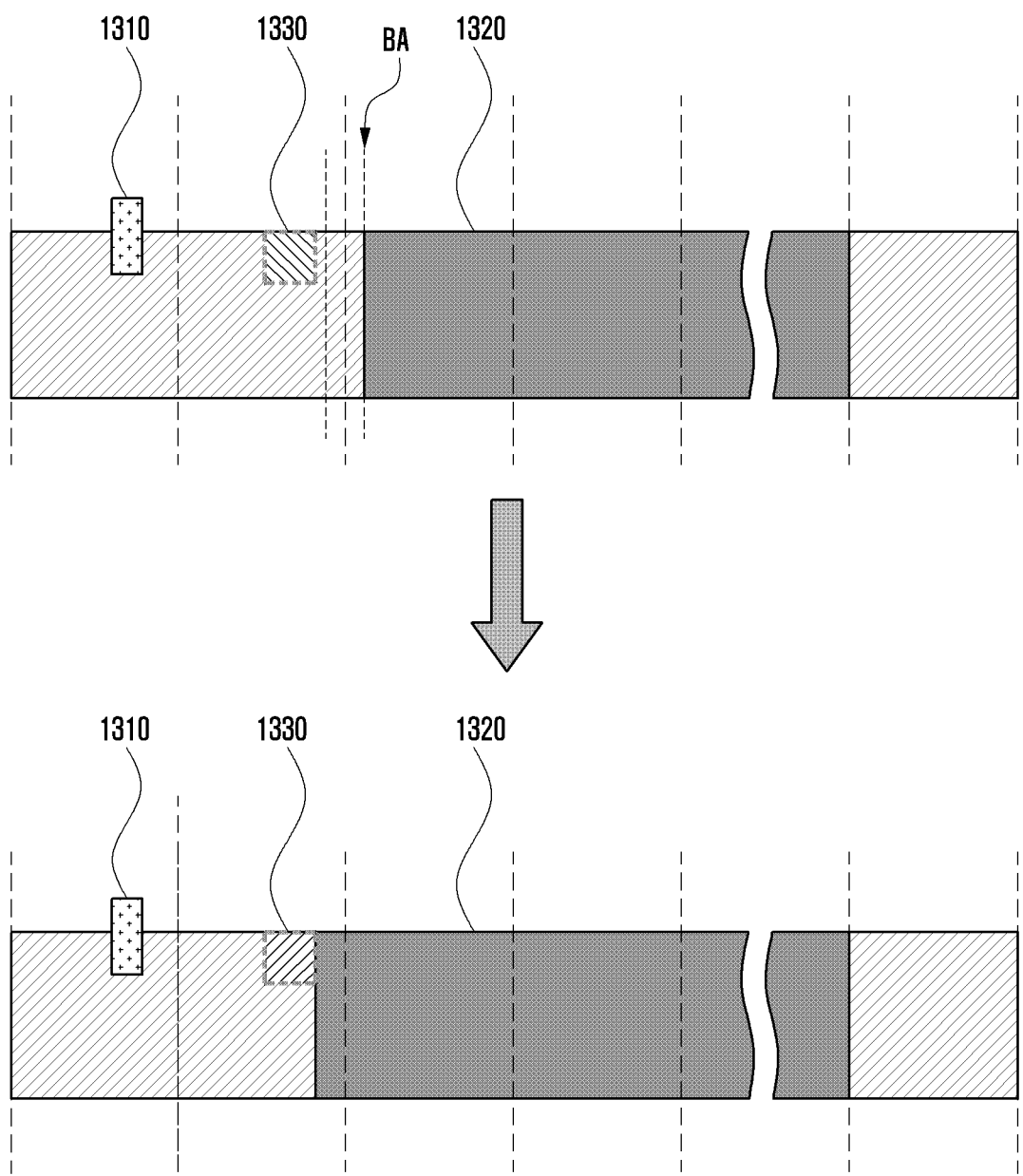
FIG. 13 illustrates an active material coating area of a negative electrode substrate or a positive electrode substrate according to an embodiment of the present disclosure.

FIG. 13 illustrates an active material coating area of a negative electrode substrate or a positive electrode substrate according to an embodiment of the present disclosure. For example, in FIG. 13, a top plan view illustrating an unrolled negative electrode substrate or positive electrode substrate of FIG. 12 is shown.

The battery 100 may be configured as the same type as or a similar type to that of FIG. 2. For example, a positive electrode tab 1310, such as the positive electrode tab 415, is attached to an end portion of one side of the substrate, and a positive electrode non-coating area may be formed in which a positive electrode active material 1320, such as the positive electrode active materials 411 and 413, is not coated in the first turn area T1 of a periphery of the positive electrode tab 1310. Unlike FIG. 2, a partial area of a positive electrode non-coating area of FIG. 13 may be an overlapping portion 1330 overlapped with a negative electrode tab 123, and a coating area of a positive electrode active material 1320 may be extended to a boundary point of a bending area BA and the overlapping portion 1330. The overlapping portion 1330 may be an area facing or overlapped with a negative electrode tab, such as the negative electrode tab 425, in a wound state.

Each of the positive electrode substrate 112 or the negative electrode substrate 114 and an inner circumferential surface and an outer circumferential surface of each substrate 112 and 114 may have a structure in which a normal type of FIG. 2 or an extension type of FIG. 3A is selectively applied. Hereinafter, this will be described in detail.

Figure 14:
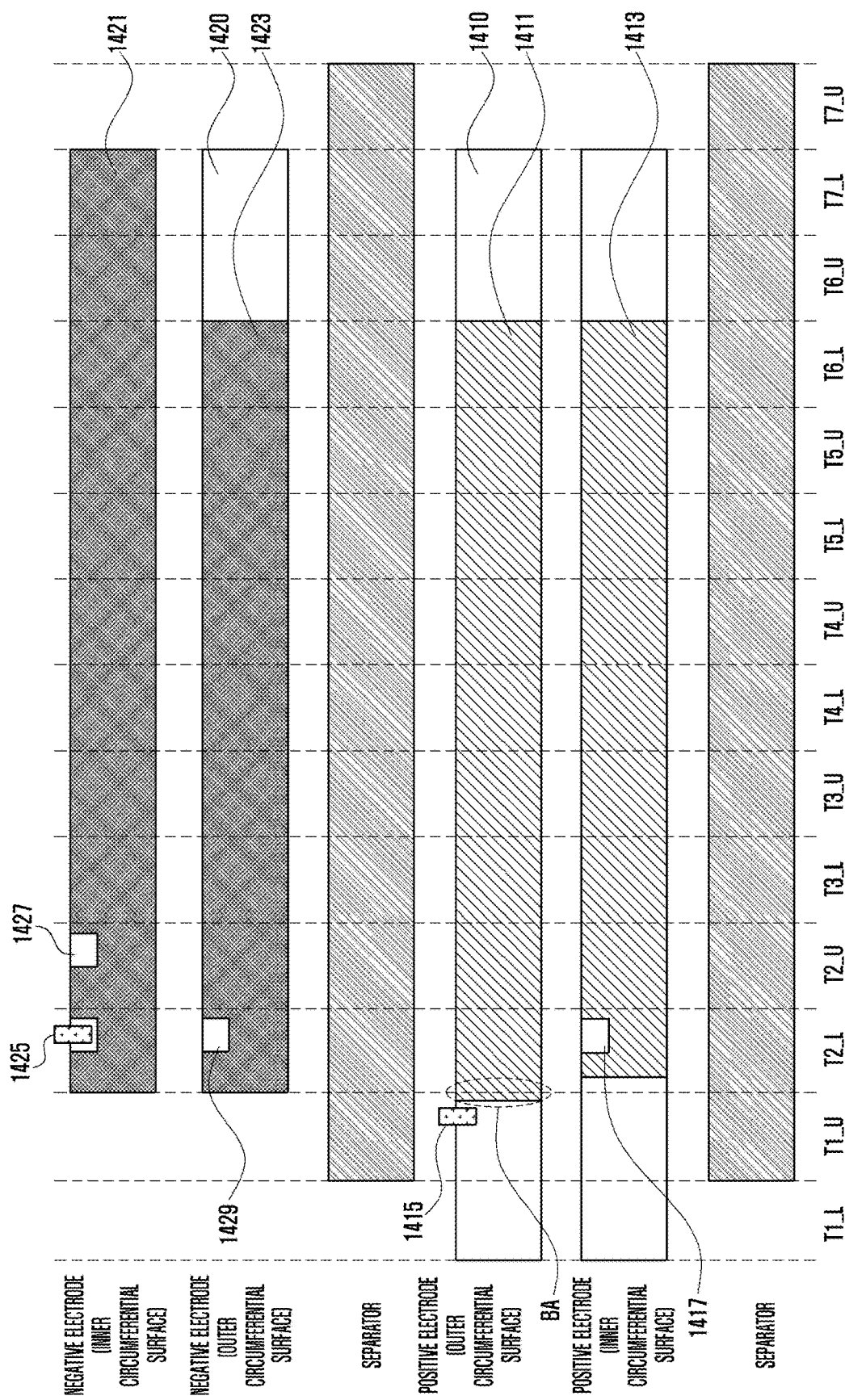
FIG. 14 illustrates an arrangement structure of an electrode assembly according to an embodiment of the present disclosure.

FIG. 14 illustrates an arrangement structure of an electrode assembly 110 according to an embodiment of the present disclosure.

In the electrode assembly 110, a positive electrode substrate 1410 may be configured in a normal type, and a negative electrode substrate 1420 may be configured in an extension type.

For example, at an outer circumferential surface of a positive electrode substrate 1410, a first positive electrode active material 1411 is coated, and the first positive electrode active material 1411 is coated only up to a previous area of an area to which a positive electrode tab 1415 is attached; thus, a positive electrode non-coating area may be formed in an end portion of an outer circumferential surface adjacent to the positive electrode tab 1415. A coating area of the first positive electrode active material 1411 may be extended to a bending area BA adjacent to the positive electrode tab 1415.

Alternatively, at an inner circumferential surface of the positive electrode substrate 1410, a second positive electrode active material 1413 is coated, and the second positive electrode active material 1413 is coated only up to a previous area of an area to which the positive electrode tab 1415 is attached; thus, a positive electrode non-coating area may be formed in an end portion of an inner circumferential surface adjacent to the positive electrode tab 1415. A positive electrode non-coating area may be formed in which the second positive electrode active material 1413 is not coated in an area overlapped with a negative electrode tab 1425 at an inner circumferential surface 1417 of the positive electrode substrate 1410.

A first negative electrode active material 1421 is coated at an inner circumferential surface of a negative electrode substrate 1420, and the first negative electrode active material 1421 may be coated to an end portion of an inner circumferential surface to which the negative electrode tab 1425 is attached. A negative electrode non-coating area may be formed in which the first negative electrode active material 1421 is not coated at an inner circumferential surface of the negative electrode substrate 1420, in a periphery of an area to which the negative electrode tab 1425 is attached and in a first area 1427 overlapped with the positive electrode tab 1415 when the electrode assembly 110 is wound.

Alternatively, a second negative electrode active material 1423 is coated at an outer circumferential surface of the negative electrode substrate 1420, and the second negative electrode active material 1423 may be coated to an end portion of an outer circumferential surface to which the negative electrode tab 1425 is attached. A negative electrode non-coating area may be formed in which the second negative electrode active material 1423 is not coated at an outer circumferential surface of the negative electrode substrate 1420, in an area 1429 overlapped with the negative electrode tab 1425.

Figure 15:
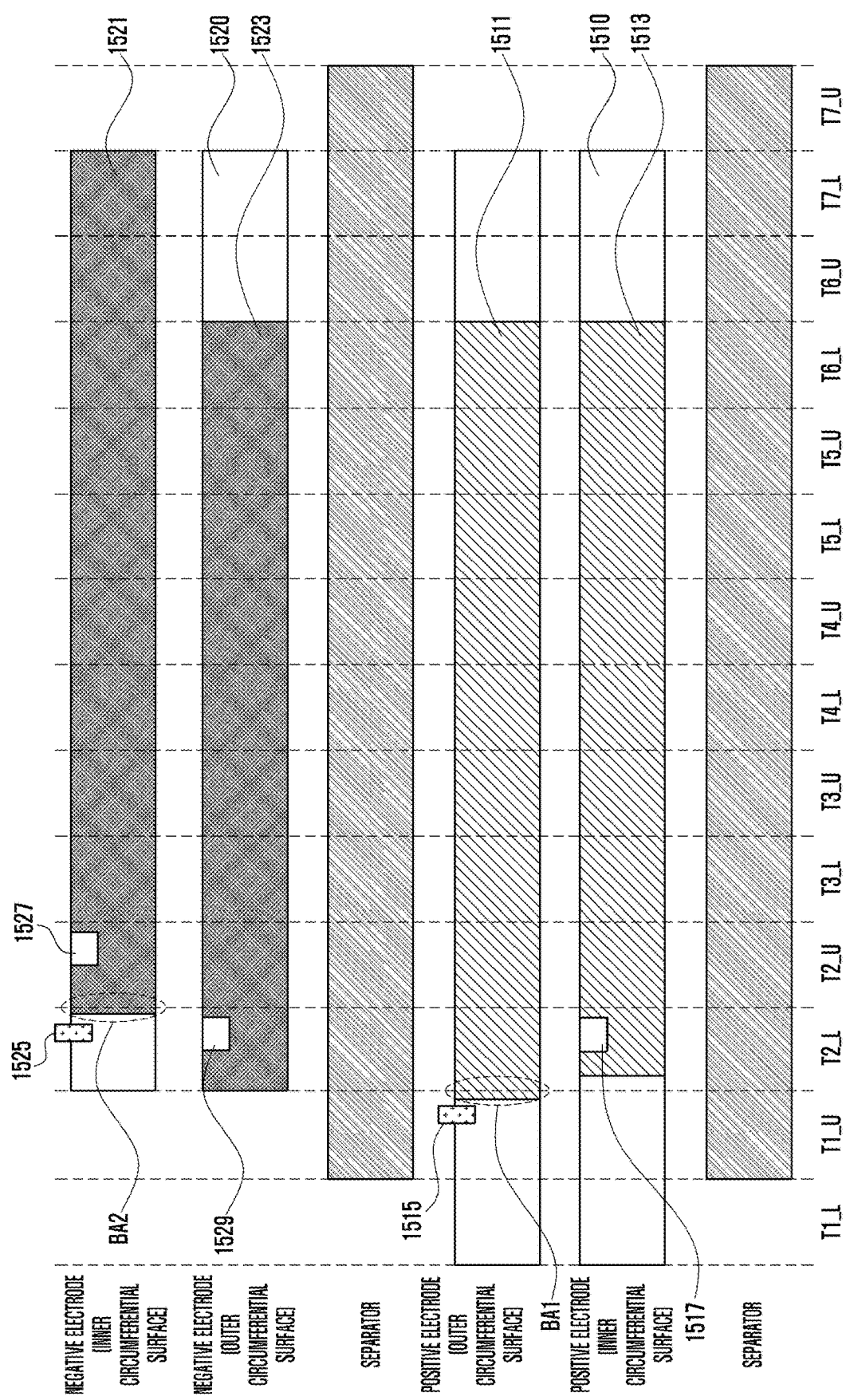
FIG. 15 illustrates an arrangement structure of an electrode assembly according to an embodiment of the present disclosure.

FIG. 15 illustrates an arrangement structure of an electrode assembly 110 according to an embodiment of the present disclosure A positive electrode substrate 1510 may be configured in a normal type, and a negative electrode substrate 1520 may be configured in a normal type and in an extension type in the electrode assembly 110.

For example, a structure of the positive electrode substrate 1510 may be similar to that of the positive electrode substrate 1410 of FIG. 14. A first positive electrode active material 1511 is coated at an outer circumferential surface of the positive electrode substrate 1510, and the first positive electrode active material 1511 is coated only up to a previous area to which a positive electrode tab 1515 is attached; thus, a positive electrode non-coating area may be formed in an end portion of an outer circumferential surface adjacent to the positive electrode tab 1515. A coating area of the first positive electrode active material 1511 may be extended to a first bending area BA1 adjacent to the positive electrode tab 1515.

Alternatively, a second positive electrode active material 1513 is coated at an inner circumferential surface of the positive electrode substrate 1510, and the second positive electrode active material 1513 is coated only up to a previous area to which the positive electrode tab 1515 is attached; thus, a positive electrode non-coating area may be formed in an end portion of an inner circumferential surface adjacent to the positive electrode tab 1515. A positive electrode non-coating area may be formed in which the second positive electrode active material 1513 is not coated in an area overlapped with a negative electrode tab 1525 at an inner circumferential surface 1517 of the positive electrode substrate 1510.

A first negative electrode active material 1521 is coated at an inner circumferential surface of the negative electrode substrate 1520, and the first negative electrode active material 1521 is coated only up to a previous area to which the negative electrode tab 1525 is attached; thus, a negative electrode non-coating area may be formed in an end portion of an inner circumferential surface adjacent to the negative electrode tab 1525. A coating area of the first negative electrode active material 1521 may be extended to a second bending area BA2 adjacent to the negative electrode tab 1525. A negative electrode non-coating area may be formed in which the first negative electrode active material 1521 is not coated in a first area 1527 overlapped with the positive electrode tab 1515 when the electrode assembly 110 is wound in an inner circumferential surface of the negative electrode substrate 1520.

Alternatively, a second negative electrode active material 1523 is coated at an outer circumferential surface of the negative electrode substrate 1520, and the second negative electrode active material 1523 may be coated to an end portion of an outer circumferential surface to which the negative electrode tab 1525 is attached. A negative electrode non-coating area may be formed in which the second negative electrode active material 1523 is not coated in an area 1529 overlapped with the negative electrode tab 1525 at an outer circumferential surface of the negative electrode substrate 1520.

Figure 16:
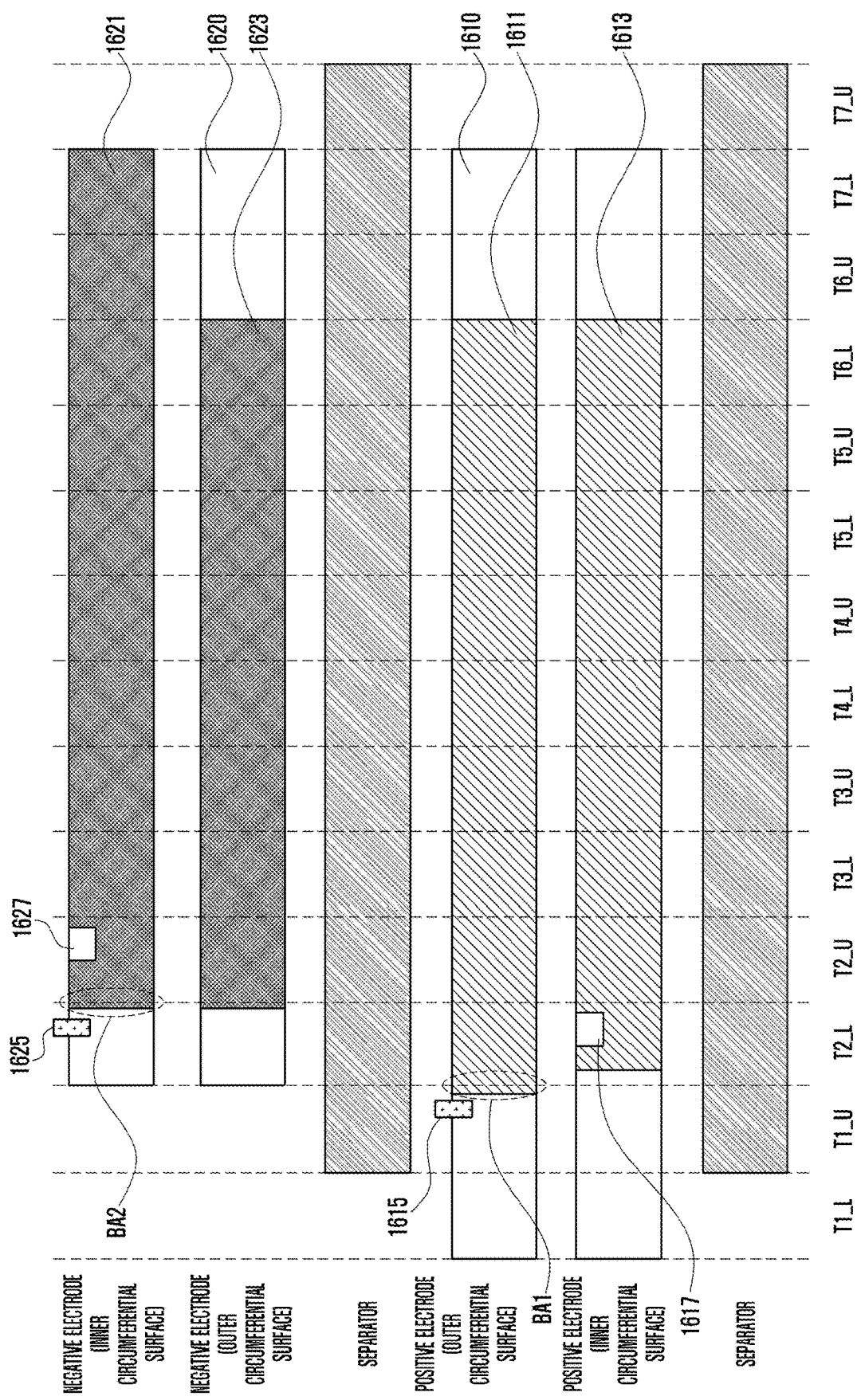
FIG. 16 illustrates an arrangement structure of an electrode assembly according to an embodiment of the present disclosure.

FIG. 16 illustrates an arrangement structure of an electrode assembly 110 according to an embodiment of the present disclosure A positive electrode substrate 1610 and a negative electrode substrate 1620 may be configured in a normal type in the electrode assembly 110.

For example, a structure of the positive electrode substrate 1610 may be similar to that of the positive electrode substrate 1410 of FIG. 14. A first positive electrode active material 1611 may be coated at an outer circumferential surface of the positive electrode substrate 1610, and the first positive electrode active material 1611 is coated only up to a previous area to which a positive electrode tab 1615 is attached; thus, a positive electrode non-coating area may be formed in an end portion of an outer circumferential surface adjacent to the positive electrode tab 1615. A coating area of the first positive electrode active material 1611 may be extended to a first bending area BA1 adjacent to the positive electrode tab 1615.

Alternatively, a second positive electrode active material 1613 is coated at an inner circumferential surface of the positive electrode substrate 1610, and the second positive electrode active material 1613 is coated only up to a previous area to which the positive electrode tab 1615 is attached; thus, a positive electrode non-coating area may be formed in an end portion of an inner circumferential surface adjacent to the positive electrode tab 1615. A positive electrode non-coating area may be formed in which the second positive electrode active material 1613 is not coated in an area overlapped with a negative electrode tab 1625 at an inner circumferential surface 1617 of the positive electrode substrate 1610.

A first negative electrode active material 1621 is coated at an inner circumferential surface of the negative electrode substrate 1620, and the first negative electrode active material 1621 is coated only up to a previous area to which the negative electrode tab 1625 is attached; thus, a negative electrode non-coating area may be formed in an end portion of an inner circumferential surface adjacent to the negative electrode tab 1625. A coating area of the first negative electrode active material 1621 may be extended to a second bending area BA2 adjacent to the negative electrode tab 1625. A negative electrode non-coating area may be formed in which the first negative electrode active material 1621 is not coated in a first area 1627 overlapped with the positive electrode tab 1615 when the electrode assembly 110 is wound at an inner circumferential surface of the negative electrode substrate 1620.

Alternatively, a second negative electrode active material 1623 is coated at an outer circumferential surface of the negative electrode substrate 1620, and the second negative electrode active material 1623 is coated only up to a previous area to which the negative electrode tab 1625 is attached; thus, a negative electrode non-coating area may be formed in an end portion of an outer circumferential surface adjacent to the negative electrode tab 1625. A coating area of the second negative electrode active material 1623 may be extended to a second bending area BA2 adjacent to the negative electrode tab 1625.

Figure 17:
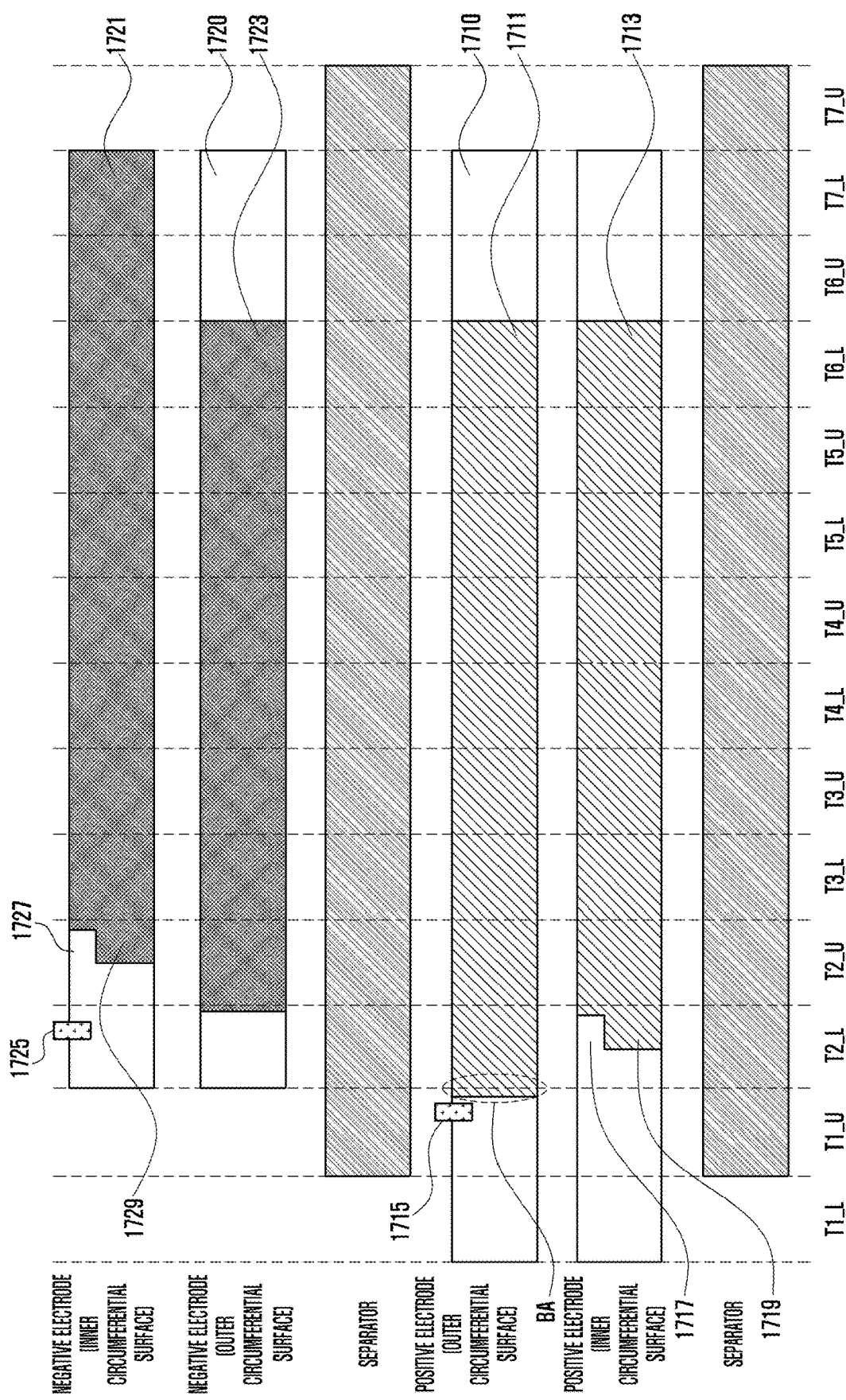
FIG. 17 illustrates an arrangement structure of an electrode assembly according to an embodiment of the present disclosure.

FIG. 17 illustrates an arrangement structure of an electrode assembly 110 according to an embodiment of the present disclosure.

A positive electrode substrate 1710 and a negative electrode substrate 1720 may be configured in a normal type in the electrode assembly 110.

For example, unlike the positive electrode substrate 1610 of FIG. 16, a form of a positive electrode non-coating area may be different at an inner circumferential surface of the positive electrode substrate 1710 in a structure of the positive electrode substrate 1710. a first positive electrode active material 1711 is coated at an outer circumferential surface of the positive electrode substrate 1710, and the first positive electrode active material 1711 is coated only up to a previous area to which a positive electrode tab 1715 is attached; thus, a positive electrode non-coating area may be formed in an end portion of an outer circumferential surface adjacent to the positive electrode tab 1715. A coating area of the first positive electrode active material 1711 may be extended to a bending area BA adjacent to the positive electrode tab 1715.

Alternatively, a second positive electrode active material 1713 is coated at an inner circumferential surface of the positive electrode substrate 1710, and the second positive electrode active material 1713 is coated only up to a previous area to which the positive electrode tab 1715 is attached; thus, a positive electrode non-coating area may be formed in an end portion of an inner circumferential surface adjacent to the positive electrode tab 1715. a positive electrode non-coating area is formed in which the second positive electrode active material 1713 is not coated in a first area 1717 overlapped with a negative electrode tab 1725 at an inner circumferential surface of the positive electrode substrate 1710, and the second positive electrode active material 1713 may be coated in a second area 1719 adjacent to the first area 1717 in a width direction (a vertical direction in the drawing) of the positive electrode substrate 1710. That is, the second positive electrode active material 1713 may be coated in a form having a step in the first and second areas 1717 and 1719.

Alternatively, the second positive electrode active material 1713 may not be coated in the first and second areas 1717 and 1719. However, the second positive electrode active material 1713 may be extended and coated to a boundary area of the first and second areas 1717 and 1719 in order to increase a charge capacity. Therefore, the second positive electrode active material 1713 may be extended while covering a bending area, such as an area located between the second turn lower area T2_L and the second turn upper area T2_U, adjacent to the first and second areas 1717 and 1719.

Unlike the negative electrode substrate 1620 of FIG. 16, a form of a negative electrode non-coating area may be different at an inner circumferential surface of the negative electrode substrate 1720 in a structure of the negative electrode substrate 1720. For example, the first negative electrode active material 1721 is coated only up to a previous area of an area to which the negative electrode tab 1725 is attached at an inner circumferential surface of the negative electrode substrate 1720, a first negative electrode active material 1721 is coated; thus, a negative electrode non-coating area may be formed in an end portion of an inner circumferential surface adjacent to the negative electrode tab 1725. A negative electrode non-coating area is formed in which the first negative electrode active material 1721 is not coated in a third area 1727 overlapped with the positive electrode tab 1715 at an inner circumferential surface of the negative electrode substrate 1720, and the first negative electrode active material 1721 may be coated in a fourth area 1729 adjacent to the third area 1727 in a width direction (a vertical direction in the drawing) of the negative electrode substrate 1720. That is, the first negative electrode active material 1721 may be coated in a form having a step in the third and fourth areas 1727 and 1729.

Alternatively, the first negative electrode active material 1721 may not be coated in the third and fourth areas 1727 and 1729. However, the first negative electrode active material 1721 may be extended and coated to a boundary area of the third and fourth areas 1727 and 1729 in order to increase a charge capacity. Therefore, the first negative electrode active material 1721 may be extended while covering a bending area, such as an area located between the second turn upper area T2_U and the third turn lower area T3_L, adjacent to the third and fourth areas 1727 and 1729.

The second negative electrode active material 1723 is coated at an outer circumferential surface of the negative electrode substrate 1720, and the second negative electrode active material 1723 is coated only up to a previous area to which the negative electrode tab 1725 is attached; thus, a negative electrode non-coating area may be formed in an end portion of an inner circumferential surface adjacent to the negative electrode tab 1725.

Figure 18:
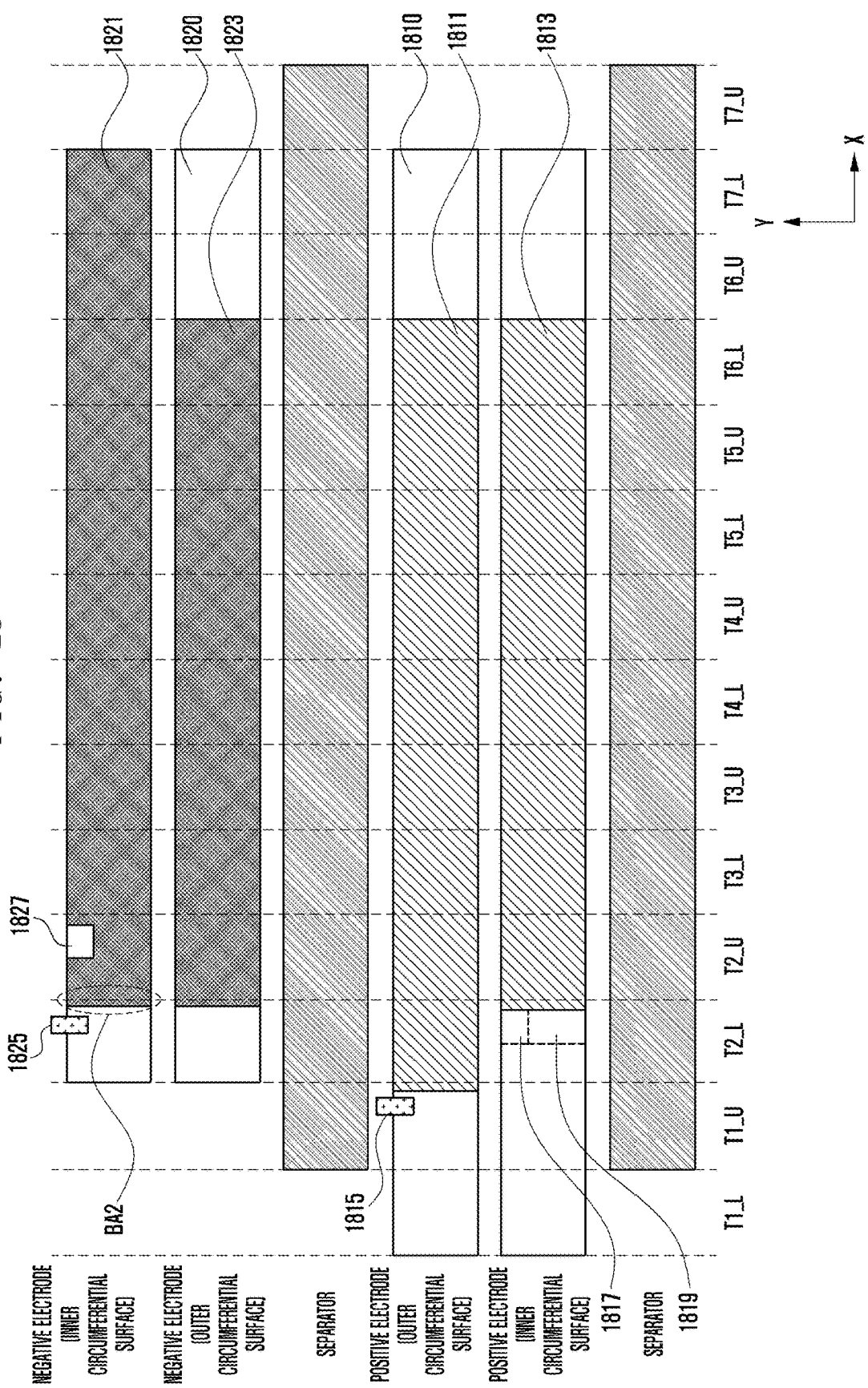
FIG. 18 illustrates an arrangement structure of an electrode assembly according to an embodiment of the present disclosure.

FIG. 18 illustrates an arrangement structure of an electrode assembly 110 according to an embodiment of the present disclosure.

A positive electrode substrate 1810 and a negative electrode substrate 1820 may be configured in a normal type in the electrode assembly 100.

For example, unlike the positive electrode substrate 1710 of FIG. 17, a coating area of a positive electrode active material 1811 may be different at an inner circumferential surface of the positive electrode substrate 1810 in a structure of the positive electrode substrate 1810. The first positive electrode active material 1811 is coated at an outer circumferential surface of the positive electrode substrate 1810, and the first positive electrode active material 1811 is coated only up to a previous area to which a positive electrode tab 1815 is attached; thus, a positive electrode non-coating area may be formed in an end portion of an outer circumferential surface adjacent to the positive electrode tab 1815.

Alternatively, a second positive electrode active material 1813 is coated at an inner circumferential surface of the positive electrode substrate 1810, and the second positive electrode active material 1813 is coated only up to a previous area to which the positive electrode tab 1815 is attached; thus, a positive electrode non-coating area may be formed in an end portion of an inner circumferential surface adjacent to the positive electrode tab 1815. A positive electrode non-coating area may be formed in a first area 1817 overlapped with a negative electrode tab 1825 and in a second area 1819 adjacent to the first area 1817 in a width direction (a vertical direction in the drawing) of the positive electrode substrate 1810 at an inner circumferential surface of the positive electrode substrate 1810.

A first negative electrode active material 1821 is coated at an inner circumferential surface of the negative electrode substrate 1820, and the first negative electrode active material 1821 is coated only up to a previous area to which the negative electrode tab 1825 is attached; thus, a negative electrode non-coating area may be formed in an end portion of an inner circumferential surface adjacent to the negative electrode tab 1825. A negative electrode non-coating area in which the first negative electrode active material 1821 is not coated may be formed in a third area 1827 overlapped with the positive electrode tab 1815 at an inner circumferential surface of the negative electrode substrate 1820.

Alternatively, a second negative electrode active material 1823 is coated at an outer circumferential surface of the negative electrode substrate 1820, and the second negative electrode active material 1823 is coated only up to a previous area to which the negative electrode tab 1825 is attached; thus, a negative electrode non-coating area may be formed in an end portion of an inner circumferential surface adjacent to the negative electrode tab 1825.

Figure 19A:
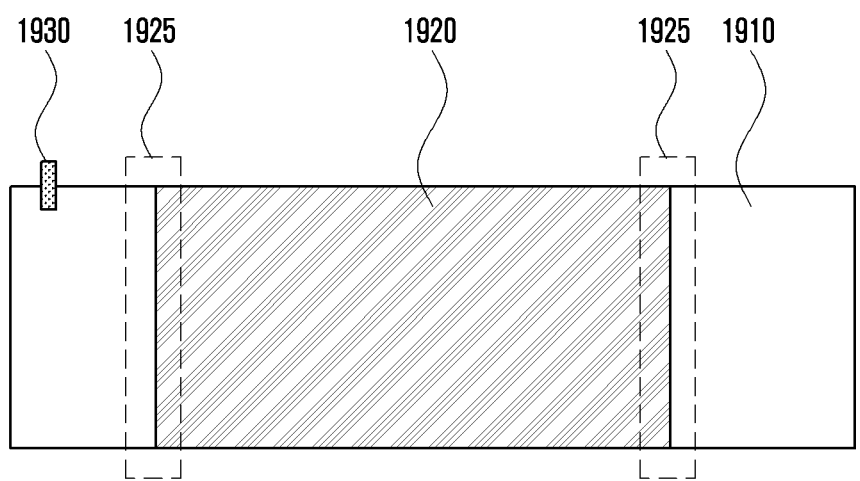
FIGS. 19A to 19C illustrate a process of assembling a battery according to an embodiment of the present disclosure.
Figure 19B:
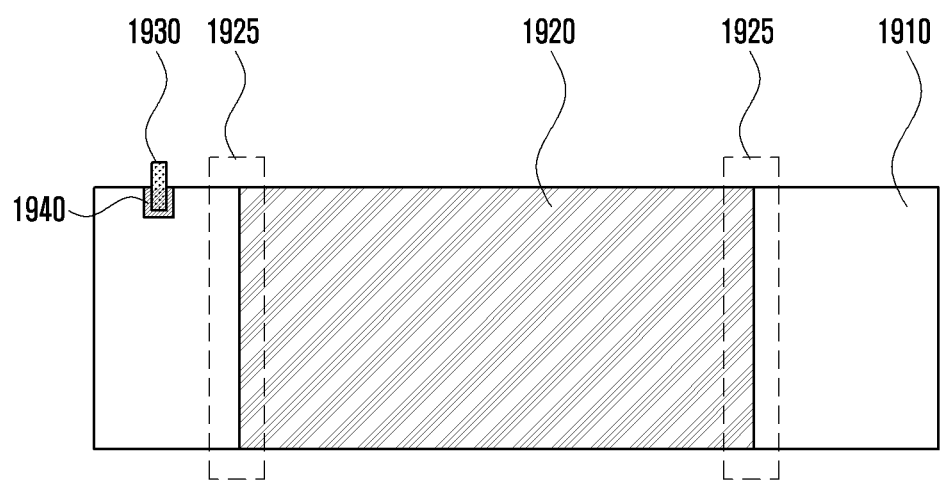
Figure 19C:
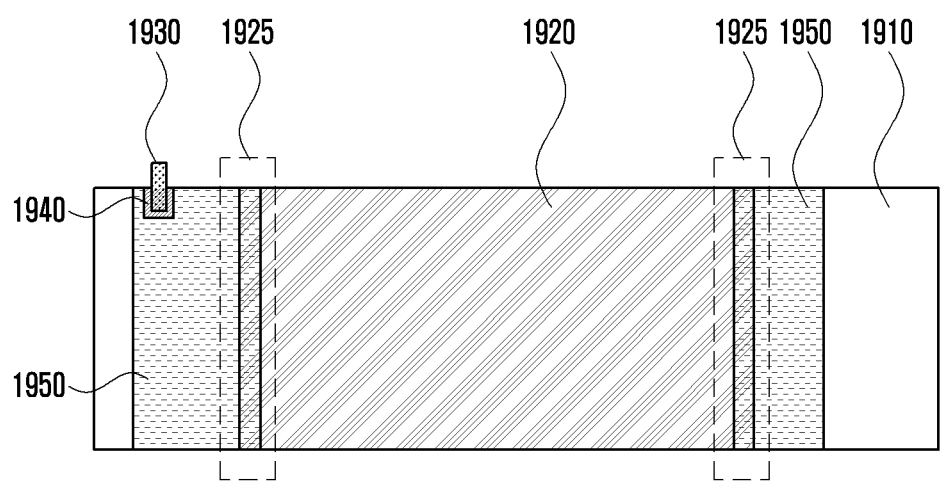

FIGS. 19A to 19C illustrate a process of assembling a battery according to an embodiment of the present disclosure. For example, FIGS. 19A to 19C are diagrams illustrating an insulating tape attachment process in order.

A conventional assembly process includes preventing an active material 1920 from separating in a boundary area 1925 of the active material 1920 coated on a substrate 1910 and attaching an insulating tape in order to prevent an electrode tab from contacting an active material of a different kind of polarity.

An insulating tape attachment process of a battery may include a first process of attaching a first insulating tape, such as the insulating tape 417 or 427, in order to cover an electrode tab and a second process of attaching a second insulating tape in order to cover the electrode tab and a boundary area.

As shown in FIG. 19A, the substrate 1910 may be provided in which the electrode tab 1930 and the active material 1920 are formed by performing a process of forming an active material 1920, such as the positive electrode active material 411 or 413 or the negative electrode active material 421 or 423, on the substrate 1910, such as the positive electrode substrate 410 or the negative electrode substrate 420, and forming an electrode tab 1930, such as the positive electrode tab 415 or the negative electrode tab 425.

Thereafter, as shown in FIG. 19B, a process of covering an area, such as an area 311 enclosing an attachment area, enclosing the electrode tab 1930 and an attachment area in which the electrode tab is attached using a first insulating tape 1940 may be performed.

Thereafter, as shown in FIG. 19C, a process of attaching a second insulating tape 1950 in order to cover both the electrode tab 1930 and the boundary area 1925 may be performed.

An insulating tape attachment process of a battery includes a first process of attaching a first insulating tape in order to cover an electrode tab and a second process of attaching a second insulating tape in order to cover the electrode tab and the boundary area 1925; thus, an insulating tape that covers the electrode tab may be formed in a dual structure. By doubly covering the electrode tab, a fire or explosion that may occur when a portion of an active material contacts the electrode tab can be prevented.

FIG. 20 is a top plan view of an unrolled surface of a positive electrode substrate or a negative electrode substrate according to an embodiment of the present disclosure.

A positive electrode substrate, such as the positive electrode substrate 410, or a negative electrode substrate, such as the negative electrode substrate 420, may include a plurality of electrode tabs, such as the positive electrode tab 415 or the negative electrode tab 425, and the plurality of electrode tabs may be disposed at a designated gap. For example, a negative electrode tab 2030 may be attached at a designated gap in a negative electrode substrate 2010, and a positive electrode tab may be attached at a designated gap in a positive electrode substrate. A plurality of negative electrode non-coating areas 2040, such as the negative electrode non-coating area 429a or 429b, may be formed to correspond to an area overlapped with a plurality of positive electrode tabs attached to the positive electrode substrate when the electrode assembly 110 is wound in the negative electrode substrate 2010. Alternatively, similar to the negative electrode substrate 2010, a plurality of positive electrode non-coating areas, such as the positive electrode non-coating area 419a or 419b, may be formed in an area overlapped with a plurality of negative electrode tabs 2030 in the positive electrode substrate when the electrode assembly 110 is wound.

Figure 21:
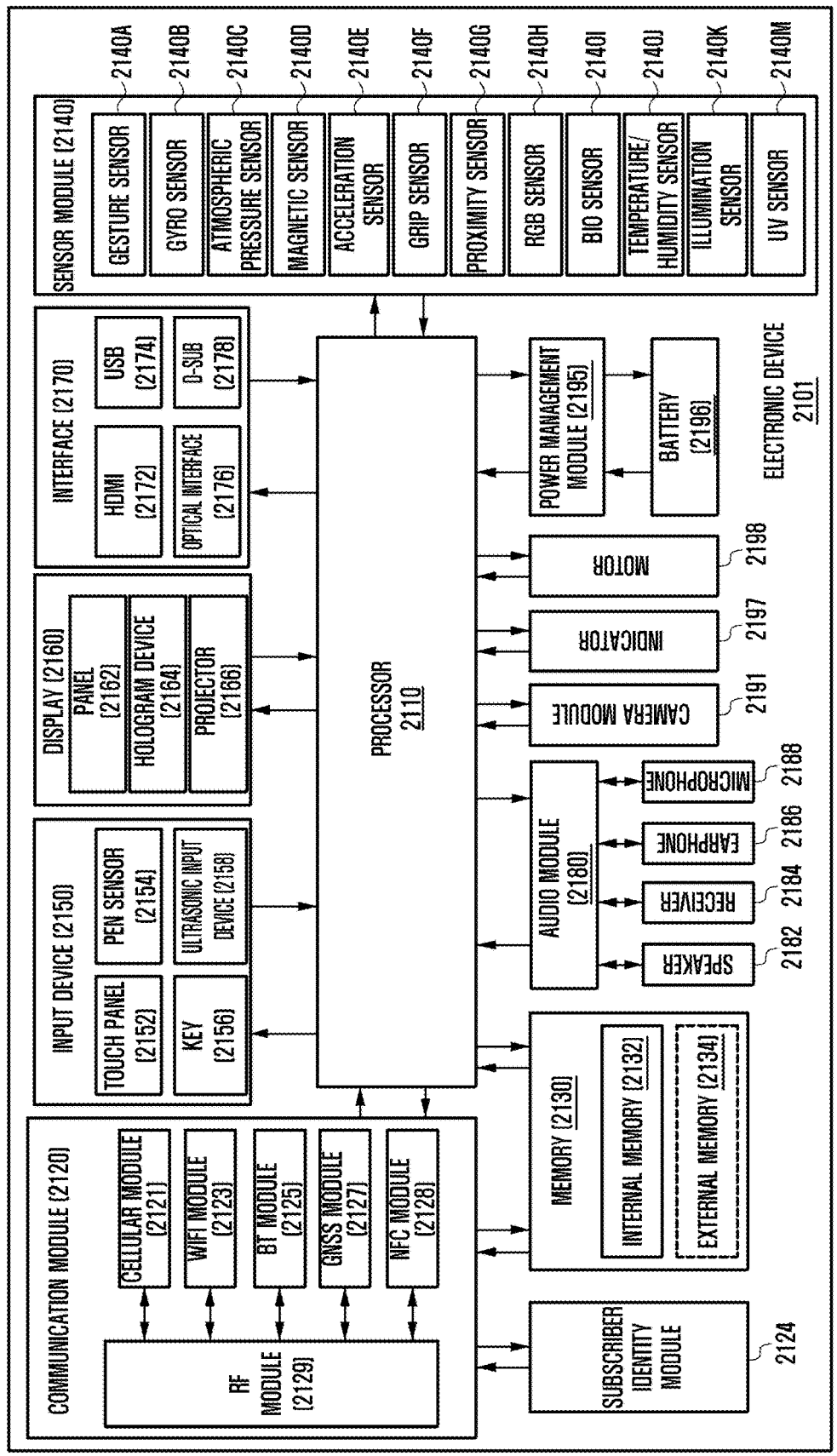
FIG. 21 is illustrates a configuration of an electronic device according to various embodiments of the present disclosure.

FIG. 21 is a block diagram of a configuration of an electronic device 2101 according to various embodiments of the present disclosure.

The electronic device 2101 may include at least one application processor 2110 (AP), communication module 2120, subscriber identity module (SIM) 2124, memory 2130, sensor module 2140, user input module 2150, display 2160, interface 2170, audio module 2180, camera module 2191, power management module 2195, battery 2196, indicator 2197, and motor 2198. By driving, for example, an operation system or an application program, the AP 2110 may control a plurality of hardware or software components connected thereto and perform various data processing and calculation. The AP 2110 may be implemented into, for example, a system on chip (SoC). According to an embodiment, the AP 2110 may further include a graphic processing unit (GPU) and/or an image signal processor. The AP 2110 may include at least a portion, such as a cellular module 2121, of constituent elements of FIG. 21. The AP 2110 may load and process an instruction or data received from at least one of other constituent elements, such as a nonvolatile memory, at a volatile memory and store result data at the nonvolatile memory.

The communication module 2120 may include a cellular module 2121, WiFi module 2123, Bluetooth module 2125, global navigation satellite system (GNSS) module 2127, near field communication (NFC) module 2128, and radio frequency (RF) module 2129. The cellular module 2121 may provide audio dedicated communication, audiovisual communication, a text service, or an Internet service through a communication network.

The cellular module 2121 may perform identification and authentication of the electronic device 2101 within a communication network using a SIM card. The cellular module 2121 may perform at least some of the functions that the AP 2110 may provide. The cellular module 2121 may include a communication processor (CP). At least a portion two or more of the cellular module 2121, the WiFi module 2123, the Bluetooth module 2125, the GNSS module 2127, and the NFC module 2128 may be included in one integrated chip (IC) or an IC package. The RF module 2129 may transmit and receive a communication signal, such as an RF signal. The RF module 2129 may include a transceiver, power amp module (PAM), frequency filter, low noise amplifier (LNA), or antenna. At least one of the cellular module 2121, WiFi module 2123, Bluetooth module 2125, GNSS module 2127, and NFC module 2128 may transmit and receive an RF signal through a separate RF module. The SIM 2124 may include, an embedded SIM or a card including a SIM and may include intrinsic identification information, such as an integrated circuit card identifier (ICCID) or subscriber information, such as an international mobile subscriber identity (IMSI).

The memory 2130, such as the memory 130, may include, an internal memory 2132 or an external memory 2134. The internal memory 2132 may include at least one of, a volatile memory, such as a dynamic read-only memory (DRAM), static read-only memory (SRAM), or synchronous dynamic read-only memory (SDRAM), nonvolatile memory, such as a one time programmable ROM (OTPROM), programmable read-only memory (PROM), erasable programmable read only memory (EPROM), electrically erasable and programmable read only memory (EEPROM), mask ROM, flash ROM, flash memory, hard drive, and solid state drive (SSD). The external memory 2134 may include a flash drive, a compact flash (CF), a secure digital (SD) card, a micro-secure digital (Micro-SD) card, a mini-secure digital (Mini-SD) card, an extreme digital (xD) card, a multi-media card (MMC), or a memory stick. The external memory 2134 may be functionally or physically connected to the electronic device 2101 through various interfaces.

The sensor module 2140 may measure a physical quantity or detect an operation state of the electronic device 2101 and convert measured or detected information to an electric signal. The sensor module 2140 may include at least one of a gesture sensor 2140A, gyro sensor 2140B, atmospheric pressure sensor 2140C, magnetic sensor 2140D, acceleration sensor 2140E, grip sensor 2140F, proximity sensor 2140G, red, green, and blue (RGB) sensor 2140H, bio sensor 2140I, temperature/humidity sensor 2140J, illumination sensor 2140K, and Ultra Violet (UV) sensor 2140M. Additionally or alternatively, the sensor module 2140 may include, an e-nose sensor, electromyograph (EMG) sensor, electroencephalogram (EEG) sensor, electrocardiogram (ECG) sensor, infrared (IR) sensor, iris sensor, and/or fingerprint sensor.

The sensor module 2140 may further include a control circuit for controlling at least one sensor that belongs therein. The electronic device 2101 further includes a processor configured to control the sensor module 2140 as a portion of the AP 2110 or separately from the AP 2110, and when the AP 2110 is in a sleep state, the electronic device 2101 may control the sensor module 2140.

The user input module 2150 may include a touch panel 2152, a digital pen sensor 2154, a key 2156, or an ultrasonic wave input device 2158. The touch panel 2152 may use at least one of capacitive, resistive, infrared ray, and ultrasonic wave methods. The touch panel 2152 may further include a control circuit and a tactile layer to provide a tactile response to a user. The digital pen sensor 2154 may be a portion of a touch panel or may include a separate recognition sheet. The key 2156 may include a physical button, optical key, or key pad. The ultrasonic input device 2158 may detect ultrasonic waves generated in an input device through a microphone 2188 to determine data corresponding to the detected ultrasonic waves.

The display 2160, such as the display 160, may include a panel 2162, a hologram device 2164, a projector 2166, and/or a control circuit for controlling them. The panel 2162 may be implemented with, a flexible, transparent, or wearable method. The panel 2162 and the touch panel 2152 may be configured in at least one module.

The panel 2162 may include a pressure, or force, sensor that can measure a pressure intensity of a user touch. The pressure sensor may be integrally implemented with the touch panel 2152 or may be implemented with at least one sensor separate from the touch panel 2152. The hologram device 2164 may show a stereoscopic image in the air using interference of light. The projector 2166 may project light on a screen to display an image. The screen may be positioned at the inside or the outside of the electronic device 2101. The interface 2170 may include, for example, a high definition multimedia interface (HDMI) 2172, universal serial bus (USB) 2174, optical interface 2176, or D-subminiature (D-sub) 2178. The interface 2170 may include a mobile high-definition link (MHL) interface, a SD card/MMC interface, or an nfrared Data Association (IrDA) specification interface.

The audio module 2180 may bilaterally convert sound and an electric signal process sound information that is input or output through a speaker 2182, a receiver 2184, an earphone 2186, or the microphone 2188. The camera module 2191 is a device that can photograph a still picture and a moving picture, and may include at least one image sensor, such as a front sensor or a rear sensor, lens, image signal processor (ISP), or flashlight such as, an LED or xenon lamp. The power management module 2195 may manage power of the electronic device 2101 and may include a power management integrated circuit (PMIC), a charger integrated circuit (IC), and a battery gauge.

The PMIC may have a wire and/or wireless charging method. The wireless charging method may include a magnetic resonance method, magnetic induction method, or electromagnetic wave method and may further include an additional circuit including a coil loop, resonant circuit, and rectifier for wireless charge. The battery gauge may measure a residual quantity of the battery 2196 and a voltage, a current, or a temperature while charging. The battery 2196 may include a rechargeable battery and/or a solar cell.

The battery 2196 may have the same structure, configuration, and form as those of the battery 100 of FIGS. 1 to 20, the electrode assembly 110 constituting the battery, and a positive electrode substrate, a positive electrode tab, a positive electrode active material, a positive electrode non-coating area, a negative electrode substrate, a negative electrode tab, a negative electrode active material, a negative electrode non-coating area, or separator constituting the electrode assembly 110.

The indicator 2197 may display a specific state a booting state, a message state, or a charge state of the electronic device 2101 or a portion, such as the AP 2110, thereof. The motor 2198 may convert an electric signal to a mechanical vibration and cause a vibration or a haptic effect. The electronic device 2101 may include a mobile television support device, such as a GPU, that can process media data according to a specification, such as digital multimedia broadcasting (DMB), digital video broadcasting (DVB), or mediaFlo™. Constituent elements described in this document may each be configured with at least one component, and a name of a corresponding element may be changed according to a kind of the electronic device. A partial constituent element of the electronic device 2101 is omitted, the electronic device 2101 further includes an additional constituent element, or by coupling some constituent elements of the electronic device 2101, one entity may be configured to equally perform a function of corresponding constituent elements before coupling.

An electronic device according to various embodiments of this disclosure may include at least one of, a smart phone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, camera, and a wearable device. The wearable device may include at least one a watch, a ring, a bracelet, ankle bracelet, a necklace, glasses, a contact lens, a head-mounted-device (HMD), textile or clothing integral type device, such as electronic clothing, a body attachment type device, such as a skin pad or tattoo, and a bio implantable circuit.

The electronic device may include a television, a digital video disk (DVD) player, an audio device, a refrigerator, an air-conditioner, a cleaner, an oven, a microwave oven, a washing machine, an air cleaner, a set-top box, a home automation control panel, a security control panel, a media box, such as Samsung HomeSync™, AppleTV™, or Google TV™, game console, such as Xbox™, PlayStation™, an electronic dictionary, an electronic key, a camcorder, and an electronic frame.

The electronic device may include a blood sugar measurement device, a heartbeat measurement device, or a body temperature measurement device, a magnetic resonance angiography (MRA) device, a magnetic resonance imaging (MRI) device, a computed tomography (CT) device, a scanning machine, an ultrasonic wave device, a navigation device, a GNSS, an event data recorder (EDR), a flight data recorder (FDR), a vehicle infotainment device, a ship navigation device, a gyro compass, avionics, a security device, a vehicle head unit, an industrial or home robot, a drone, an automatic teller machine (ATM) of a financial institution, a point of sales (POS) device of a store, and an Internet of things device, such as a light bulb, various sensors, a sprinkler, a fire alarm, a thermostat, a street light, a toaster, an exercise device, a hot water tank, a heater, a boiler.

The electronic device may include furniture, a portion of a building/structure or a vehicle, an electronic board, an electronic signature receiving device, a projector, and various measurement devices, such as a water supply, electricity, gas, or electric wave measurement device. The electronic device may be flexible or may be two or more of the foregoing devices. An electronic device according to aspects of this disclosure is not limited to the foregoing devices. In this disclosure, a term "user" may indicate a person using an electronic device or a device, such as an artificial intelligence electronic device using an electronic device. Constituent elements may each be formed with at least one component, and a name of a corresponding element may be changed according to a kind of electronic device. The electronic device may include at least one constituent element described in this document and some constituent elements may be omitted or the electronic device may further include additional constituent elements. As some of elements of an electronic device are coupled to form an entity, the entity may equally perform a function of corresponding elements before coupling.

While the present disclosure has been described in detail with reference to certain embodiments thereof, it will be understood by those skilled in the art that variations and modifications in form and detail may be made therein without departing from the spirit and scope of the present disclosure as defined by the appended claims and their equivalents.

What is claimed is:

1. A battery, comprising:
a positive electrode assembly comprising a positive electrode substrate, a positive electrode active material coated at one surface of the positive electrode substrate, and a positive electrode tab attached to the one surface of the positive electrode substrate;
a negative electrode assembly comprising a negative electrode substrate, a negative electrode active material coated at one surface of the negative electrode substrate, and a negative electrode tab attached to the one surface of the negative electrode substrate; and
a separator located between the positive electrode assembly and the negative electrode assembly,
wherein in a first area facing the positive electrode tab at the one surface of the negative electrode substrate, the negative electrode active material is not coated, and in a second area adjacent to the first area in a length direction of the positive electrode tab at the one surface of the negative electrode substrate, the negative electrode active material is coated.

2. The battery of claim 1, wherein an end portion of one direction of the positive electrode substrate and an end portion of one direction of the negative electrode substrate are non-overlappedly aligned.

3. The battery of claim 1, further comprising a plurality of turn areas in which the positive electrode substrate, the separator, and the negative electrode substrate are wound in a jelly-roll shape and comprising a first turn area and a second turn area.

4. The battery of claim 3, wherein in the negative electrode substrate, in another turn area adjacent to a turn area in which the positive electrode tab is disposed in the plurality of turn areas, the first area is formed in which the negative electrode active material is not coated.

5. The battery of claim 4, wherein in an area corresponding to the first area at an opposite surface of the one surface of the negative electrode substrate, the negative electrode active material is not coated.

6. The battery of claim 3, wherein in a third area facing the negative electrode tab at the one surface of the positive electrode substrate, the positive electrode active material is not coated, and in a fourth area adjacent to the third area in a length direction of the negative electrode tab at the one surface of the positive electrode substrate, the positive electrode active material is coated.

7. The battery of claim 6, wherein in the positive electrode substrate, in another turn area adjacent to a turn area in which the negative electrode tab is disposed in the plurality of turn areas, the third area is formed in which the positive electrode active material is not coated.

8. The battery of claim 3, wherein the positive electrode tab is attached to an inner circumferential surface or an outer circumferential surface of the positive electrode substrate in an upper area of the first turn area, and
wherein an end portion of a lower area of the first turn area of the positive electrode substrate is overlapped with the positive electrode tab.

9. The battery of claim 1, wherein at least a portion of the positive electrode tab is covered with a first insulating tape, and
wherein at least a portion of the first insulating tape and the positive electrode active material is covered with a second insulating tape.

10. A battery, comprising:
a positive electrode assembly comprising a positive electrode substrate, a positive electrode active material coated at one surface of the positive electrode substrate, and a positive electrode tab attached to the one surface of the positive electrode substrate;
a negative electrode assembly comprising a negative electrode substrate, a negative electrode active material coated at one surface of the negative electrode substrate, and a negative electrode tab attached to the one surface of the negative electrode substrate; and
a separator located between the positive electrode assembly and the negative electrode assembly,
wherein in a first area facing the negative electrode tab at the one surface of the positive electrode substrate, the positive electrode active material is not coated, and in a second area adjacent to the first area in a length direction of the negative electrode tab at the one surface of the positive electrode substrate, the positive electrode active material is coated.

11. The battery of claim 10, wherein an end portion of one direction of the positive electrode substrate and an end portion of one direction of the negative electrode substrate are non-overlappedly aligned.

12. The battery of claim 10, further comprising a plurality of turn areas in which the positive electrode substrate, the separator, and the negative electrode substrate are wound in a jelly-roll shape and comprising a first turn area and a second turn area.

13. The battery of claim 12, wherein in the positive electrode substrate, in another turn area adjacent to a turn area in which the negative electrode tab is disposed in the plurality of turn areas, the first area is formed in which the positive electrode active material is not coated.

14. The battery of claim 13, wherein in an area corresponding to the first area at an opposite surface of the one surface of the positive electrode substrate, the positive electrode active material is not coated.

15. The battery of claim 12, wherein in a third area facing the positive electrode tab at the one surface of the negative electrode substrate, the negative electrode active material is not coated, and in a fourth area adjacent to the third area in a length direction of the positive electrode tab at the one surface of the negative electrode substrate, the negative electrode active material is coated.

16. The battery of claim 15, wherein in the negative electrode substrate, the third area is formed in which the negative electrode active material is not coated in another turn area adjacent to a turn area in which the positive electrode tab is disposed in the plurality of turn areas.

17. The battery of claim 12, wherein the negative electrode tab is attached to an inner circumferential surface or an outer circumferential surface of the negative electrode substrate in an upper area of the first turn area, and
wherein an end portion of a lower area of the first turn area of the negative electrode substrate is overlapped with the negative electrode tab.

18. An electronic device, comprising:
a communication module;
a processor; and
a battery,
wherein the battery comprises:
a positive electrode assembly comprising a positive electrode substrate, a positive electrode active material coated at one surface of the positive electrode substrate, and a positive electrode tab attached to the one surface of the positive electrode substrate;
a negative electrode assembly comprising a negative electrode substrate, a negative electrode active material coated at one surface of the negative electrode substrate, and a negative electrode tab attached to the one surface of the negative electrode substrate; and
a separator located between the positive electrode assembly and the negative electrode assembly,
wherein in a first area facing the positive electrode tab at the one surface of the negative electrode substrate, the negative electrode active material is not coated, and in a second area adjacent to the first area in a length direction of the positive electrode tab at the one surface of the negative electrode substrate, the negative electrode active material is coated.

19. The electronic device of claim 18, wherein the battery further comprises a plurality of turn areas in which the positive electrode substrate, the separator, and the negative electrode substrate are wound in a jelly-roll shape and comprises a first turn area and a second turn area.

20. The electronic device of claim 19, wherein in the negative electrode substrate, in another turn area adjacent to a turn area in which the positive electrode tab is disposed in the plurality of turn areas, the first area is formed in which the negative electrode active material is not coated.

21. The electronic device of claim 20, wherein in an area corresponding to the first area at an opposite surface of the one surface of the negative electrode substrate, the negative electrode active material is not coated.

22. The electronic device of claim 19, wherein the positive electrode tab is attached to an inner circumferential surface or an outer circumferential surface of the positive electrode substrate in an upper area of the first turn area, and wherein an end portion of a lower area of the first turn area of the positive electrode substrate is overlapped with the positive electrode tab.

* * * * *